(12) United States Patent  
Ishii

(10) Patent No.: US 7,052,190 B2
(45) Date of Patent: May 30, 2006

(54) PRINTING PROCESSING DEVICE AND METHOD THEREOF

(75) Inventor: Yuuichi Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/900,095

(22) Filed: Jul. 28, 2004

(65) Prior Publication Data

US 2005/0053402 A1    Mar. 10, 2005

(30) Foreign Application Priority Data

Jul. 31, 2003  (JP)  ............................. 2003-204822
Jun. 25, 2004  (JP)  ............................. 2004-188075

(51) Int. Cl.
*B41J 5/30* (2006.01)
*G06F 15/00* (2006.01)

(52) U.S. Cl. ....................................... 400/62; 358/1.15

(58) Field of Classification Search .................. 400/62; 358/1.13, 1.15, 1.9; 709/232, 203
See application file for complete search history.

(56) References Cited

U.S. PATENT DOCUMENTS

| 5,768,483 A * | 6/1998 | Maniwa et al. ............ 358/1.15 |
| 6,633,395 B1 * | 10/2003 | Tuchitoi et al. ............ 358/1.14 |
| 2002/0030840 A1 * | 3/2002 | Itaki et al. ................. 358/1.13 |
| 2002/0114004 A1 * | 8/2002 | Ferlitsch ..................... 358/1.15 |
| 2003/0098993 A1 * | 5/2003 | Ohara ........................ 358/1.15 |
| 2003/0103221 A1 | 6/2003 | Natori ......................... 358/1.9 |
| 2003/0182438 A1 * | 9/2003 | Tenenbaum .................. 709/232 |
| 2004/0064785 A1 * | 4/2004 | Sasaki et al. ................ 715/500 |
| 2004/0085568 A1 * | 5/2004 | Sesek et al. ................ 358/1.15 |
| 2004/0263899 A1 * | 12/2004 | Ferlitsch ..................... 358/1.15 |
| 2005/0024664 A1 * | 2/2005 | Schmidt ..................... 358/1.13 |

FOREIGN PATENT DOCUMENTS

| JP | 2002-166630 | 6/2002 |
| WO | WO 97/06481 | 2/1997 |

* cited by examiner

*Primary Examiner*—Andrew H. Hirshfeld
*Assistant Examiner*—Wasseem H. Hamdan
(74) *Attorney, Agent, or Firm*—Oblon, Spivak, McClelland, Maier & Neustadt, P.C.

(57) ABSTRACT

A printing processing device in which different jobs are generated at different stages of the printing process is disclosed that is capable of providing information of different jobs generated at different stages in connection with each other. The printing processing device includes a job information providing unit that provides the client device, in response to an information providing request from the client device for providing information of the printing job, with first job state identification information and second job state identification information in connection with the first job state identification information. The first job state identification information is used for identifying a state of a first-stage job generated at a first stage of the printing process, and the second job state identification information is used for identifying a state of a second-stage job generated at a second stage of the printing process. The second-stage job is generated from the first-stage job and has a job granularity different from the job granularity of the first-stage job.

35 Claims, 39 Drawing Sheets

FIG.9

420 SETTING PAGE

421

DOCUMENT : DOCUMENT 1

☐ PUT ALL IN ONE

PRINTER : PRINTER XXX ▶

RANGE : ● ALL SECTION
○ SECTION NO.: No. 5 ~ No. 5

PAPER SIZE : A4 ▶

PRINTING DIRECTION : ● ○

IMAGE SETTING : STARTING POSITION ● CENTERING
○ LEFT-UPPER CORNER REFERENCE
☑ WITHIN PAGE

[ OK ]  [ CANCEL ]

423

SETTING REGION 422

FIG.11

| ITEM | VALUE |
| --- | --- |
| JOB ID | 001 |
| JOB STATUS | pending |
| NUMBER OF SUB-JOBS | 0 |
| SUB-JOB ID LIST | |
| JOB ENTRY TIME | ...... |
| JOB NAME | DOCUMENT 1 |
| CLIENT NAME | TERMINAL 40 |
| FLAG | true |
| : | : |

FIG.15

| ITEM | VALUE |
|---|---|
| JOB ID | 10 |
| JOB STATUS | processing |
| NUMBER OF SUB-JOBS | 0 |
| SUB-JOB ID LIST | |
| JOB ENTRY TIME | ・・・・・・ |
| JOB NAME | FILE A |
| CLIENT NAME | TERMINAL 40 |
| FLAG | true |
| : | : |

FIG.18

| ITEM | VALUE |
| --- | --- |
| JOB ID | 20 |
| JOB STATUS | processing |
| NUMBER OF SUB-JOBS | 0 |
| SUB-JOB ID LIST | |
| JOB ENTRY TIME | ...... |
| JOB NAME | FILE B |
| CLIENT NAME | TERMINAL 40 |
| FLAG | true |
| : | : |

FIG.19

| PRINTING JOB ID | SPOOLER JOB ID | PRINTER JOB ID |
|---|---|---|
| 001 | 10 | |
| 001 | 20 | |

| ITEM | VALUE |
|---|---|
| JOB ID | 001 |
| JOB STATUS | processing |
| NUMBER OF SUB-JOBS | 2 |
| SUB-JOB ID LIST | 10, 20 |
| JOB ENTRY TIME | ...... |
| JOB NAME | DOCUMENT 1 |
| CLIENT NAME | TERMINAL 40 |
| FLAG | true |
| : | : |

FIG.21

| ITEM | VALUE |
|---|---|
| JOB ID | ABC |
| JOB STATUS | executing |
| NUMBER OF SUB-JOBS | 0 |
| SUB-JOB ID LIST | |
| JOB ENTRY TIME | ...... |
| JOB NAME | FILE A |
| CLIENT NAME | TERMINAL 40 |
| FLAG | true |
| : | : |

FIG.22

| ITEM | VALUE |
|---|---|
| JOB ID | 10 |
| JOB STATUS | executing |
| NUMBER OF SUB-JOBS | 1 |
| SUB-JOB ID LIST | ABC |
| JOB ENTRY TIME | ...... |
| JOB NAME | FILE A |
| CLIENT NAME | TERMINAL 40 |
| FLAG | true |
| : | : |

FIG.24

| ITEM | VALUE |
|---|---|
| JOB ID | 001 |
| JOB STATUS | executing |
| NUMBER OF SUB-JOBS | 2 |
| SUB-JOB ID LIST | 10, 20 |
| JOB ENTRY TIME | ...... |
| JOB NAME | DOCUMENT 1 |
| CLIENT NAME | TERMINAL 40 |
| FLAG | true |
| : | : |

FIG.28

| ARGUMENT | INPUT/OUTPUT |
|---|---|
| PARENT JOB ID | INPUT |
| JOB ID | INPUT |
| STATUS INFORMATION | OUTPUT |

FIG.29

SIMPLE OBJECT ACCESS PORTOCOL (SOAP) MESSAGE
/710

```
<?xml version="1.0" encoding="UTF-8?>
<soapenv:Envelope xmlns:soapenv="........" .....>
   <soapenv:Body>    ~711
      <ns1:getJobList soapenv:encodingStyle="......" ....>
         <parentJobID>001</parentJobID>~712
         <jobID></jobID>~713
         <jobCount>1</jobCount>
         <printerName>RRRPrinter</printerName>
         <clientName>user01</clientName>               }714
            :
      </ns1:getJobList>
   </soapenv:Body>
</soapenv:Envelope>
```

FIG.31

720 SIMPLE OBJECT ACCESS PROTOCOL (SOAP) MESSAGE

```xml
<?xml version="1.0" encoding="UTF-8?>
<soapenv:Envelope xmlns:soapenv=".........." ....>
   <soapenv:Body>
      <ns1:getJobListResponse soapenv:encodingStyle="......" ....>
         <returnValue>0</returnValue>
         <jobList ...>
            <item href="#id0"/>
         </jobList>
         <nextFlag ..>false</nextFlag>
      </ns1:getJobListResponse>
      <multiRef id="id0" soapenc:root="0" soapenv:encodingStyle="..." .>
         <jobID>001</jobID>
         <jobStatys>executing</jobStatus>   ~722
         <jobType>EACH_DOC</jobType>
         <entryTime>2003-05-23T08:39:35.000Z</entryTime>  ~723
         <numOfSubJob>2</numOfSubJob>  ~724
         <SubJobIds>
            <item>10</item>       }─725
            <item>20</item>
         </SubJobIds>
         <otherProps>
            <item href="#id1"/>
            <item href="#id2"/>
            <item href="#id3"/>
            <item href="#id4"/>
            <item href="#id5"/>
         </otherProps>
      </multiRef>
      <multiRef id="id3" soapenc:root="0" soapenv:encodingStyle="..." .>
         <propName>controllable</propName>  }─726
         <propVal>true</propVal>
      </multiRef>
      <multiRef id="id3" soapenc:root="0" soapenv:encodingStyle="..." .>
         <propName>duration</propName>
         <propVal></propVal>
      </multiRef>
      <multiRef id="id3" soapenc:root="0" soapenv:encodingStyle="..." .>
         <propName>endedDate</propName>
         <propVal></propVal>
      </multiRef>
      <multiRef id="id3" soapenc:root="0" soapenv:encodingStyle="..." .>
         <propName>clientName</propName>
         <propVal>user01</propVal>
      </multiRef>
      <multiRef id="id3" soapenc:root="0" soapenv:encodingStyle="..." .>
         <propName>jobName</propName>      }─727
         <propVal>DOCUMENT 1</propVal>
      </multiRef>
   </soapenv:Body>
</soapenv:Envelope>
```

721 encompasses the multiRef blocks.

FIG.32

430 JOB LIST PAGE

432 CANCEL  433 PAUSE

| JOB NAME | JOB STATUS | ENTRY TIME |
|---|---|---|
| ☐ >>DOCUMENT 1 | EXECUTING | 2003/05/23 10:08 |
| ☐ >>DOCUMENT 2 | PROCESSING | 2003/05/23 10:10 |
| ☐ DOCUMENT 3 | PENDING | 2003/05/23 10:11 |

SIMPLE OBJECT ACCESS PORTOCOL (SOAP) MESSAGE 730

```
<?xml version="1.0" encoding="UTF-8?>
<soapenv:Envelope xmlns:soapenv=" ........ " ..... >
 <soapenv:Body>
  <ns1:getJobList soapenv:encodingStyle=" ..... " ....>
   <parentJobID>001</parentJobID> ～731
   <jobID>10</jobID> ～732
   <jobCount>1</jobCount>
   <printerName>RRRPrinter</printerName>
   <clientName>user01</clientName>
     :
  </ns1:getJobList>
 </soapenv:Body>
</soapenv:Envelope>
```

FIG.34

740 SIMPLE OBJECT ACCESS PROTOCOL (SOAP) MESSAGE

```
<?xml version="1.0" encoding="UTF-8?>
<soapenv:Envelope xmlns:soapenv="........" ....>
   <soapenv:Body>
      <ns1:getJobListResponse soapenv:encodingStyle="......" ....>
         <returnValue>0</returnValue>
         <jobList ...>
            <item href="#id0"/>
         </jobList>
         <nextFlag ...>false</nextFlag>
      </ns1:getJobListResponse>
      <multiRef id="id0" soapenc:root="0" soapenv:encodingStyle="..." ..>
         <parentJobID>001</parentJobID>
         <jobID>10</jobID>
         <jobStatys>completed</jobStatus> ⁓ 741
         <jobType>EACH_DOC</jobType>
         <entryTime>2003-05-23T08:39:35.000Z</entryTime>
         <numOfSubJob>1</numOfSubJob> ⁓ 742
         <SubJobIds>
            <item>ABC</item> ⁓ 743
         </SubJobIds>
         <otherProps>
            <item href="#id1"/>
            <item href="#id2"/>
            <item href="#id3"/>
            <item href="#id4"/>
            <item href="#id5"/>
         </otherProps>
      </multiRef>
      <multiRef id="id3" soapenc:root="0" soapenv:encodingStyle="..." ..>
         <propName>controllable</propName>   ⎫
         <propVal>false</propVal>            ⎬ 744
      </multiRef>
      <multiRef id="id3" soapenc:root="0" soapenv:encodingStyle="..." ..>
         <propName>duration</propName>
         <propVal></propVal>
      </multiRef>
      <multiRef id="id3" soapenc:root="0" soapenv:encodingStyle="..." ..>
         <propName>endedDate</propName>
         <propVal></propVal>
      </multiRef>
      <multiRef id="id3" soapenc:root="0" soapenv:encodingStyle="..." ..>
         <propName>clientName</propName>
         <propVal>user01</propVal>
      </multiRef>
      <multiRef id="id3" soapenc:root="0" soapenv:encodingStyle="..." ..>
         <propName>jobName</propName>       ⎫
         <propVal>ファイルA</propVal>         ⎬ 745
      </multiRef>
   </soapenv:Body>
</soapenv:Envelope>
```

FIG.35

440 JOB LIST PAGE

[CANCEL] [PAUSE]

| | JOB NAME | JOB STATUS | | ENTRY TIME |
|---|---|---|---|---|
| ☐ | ↓ DOCUMENT 1 | EXECUTING | | 2003/05/23 10:08 |
| ☐ | >>FILE A | COMPLETED | ⎫ 441 | |
| ☐ | >>FILE B  443 | EXECUTING | ⎭ | |
| ☐ | >>DOCUMENT 2  442 | PROCESSING | | 2003/05/23 10:10 |
| ☐ | DOCUMENT 3 | PENDING | | 2003/05/23 10:11 |

FIG.36

450 JOB LIST PAGE

| | JOB NAME | JOB STATUS | ENTRY TIME |
|---|---|---|---|
| ☐ | ↓DOCUMENT 1 | EXECUTING | 2003/05/23 10:08 |
| ☐ | >>FILE A | COMPLETED | |
| ☐ | ↓FILE B | EXECUTING | } 451 |
| | FILE B | | |
| ☐ | >>DOCUMENT 2 | PROCESSING | 2003/05/23 10:10 |
| ☐ | DOCUMENT 3 | PENDING | 2003/05/23 10:11 |

453

CANCEL  PAUSE

460 JOB LIST PAGE

| | JOB NAME | JOB STATUS | ENTRY TIME |
|---|---|---|---|
| | | CANCEL PAUSE | |
| ☐ | ↓ DOCUMENT 1 | COMPLETED | 2003/05/23 10:08 |
| ☐ | >> FILE A | COMPLETED | |
| ☐ | >>DOCUMENT 2 | PROCESSING | 2003/05/23 10:10 |
| ☐ | DOCUMENT 3 | PENDING | 2003/05/23 10:11 |

PRINTING PROCESSING DEVICE AND METHOD THEREOF

BACKGROUND OF THE INVENTION

1. Field of the Invention

The present invention relates to a printing processing device and a method for controlling the printing processing device, particularly, a printing processing device capable of providing information of a job executed in response to a printing request, a method for controlling the printing processing device, an image processing device, and a document management device.

2. Description of the Related Art

When printing document data, for example, under the Windows (a registered trademark) OS (Operating System), a user starts up an application able to handle the document data and issues a printing command to print the document data on a certain printer. After that, the document data are converted by a printing driver, which receives a request from the application, into printing data able to be processed by the specified printer. Afterwards, the printing data are output to a spooler, and are further transmitted to the printer from the spooler through a port monitor.

The user is able to confirm the state of the printing process by using tools provided by the OS. Generally, one is able to view jobs in the spooler with these tools.

For example, Japanese Laid-Open Patent Application No. 2002-166630 (below, referred to as "reference 1") discloses an invention in which when printing document data on a number of printers in response to one printing request, job information is provided to allow a user to confirm the relation between a parent job corresponding to the printing request and sub-jobs on the respective printers.

When the user makes one printing request to print a number of document files, at different stages of the printing process corresponding to the printing request, a first type of job can be defined to correspond to the printing process for all of the document files related to the printing request, and a second type of job can be defined to correspond to a printing process for each of the document files.

That is, the first type of job is generated at the time when the printing request is received, and the second type of job is generated when the printing process proceeds one file by one file based on the first type of job.

The jobs in the spooler, which are confirmable to the user, correspond to the second type of jobs. Therefore, even though the user is able to confirm the state of the printing process of each document file, he cannot easily confirm, for example, completion of the printing process of all the document files related to the printing request.

Especially, in the spooler of a server, which executes printing processes after receiving requests from more than one client, because printing requests from more than one user exist, even when a user is able to confirm the states of the second type of jobs related to his printing request, it is difficult for the user to confirm the state of the first type of job related to his printing request.

The method disclosed in the aforesaid reference 1 enables easy confirmation of states of jobs in the specified printers, but is not capable of providing job information of different jobs generated at different stages of the printing process corresponding to the printing request.

SUMMARY OF THE INVENTION

It is a general object of the present invention to solve one or more problems of the related art.

A specific object of the present invention is to provide a printing processing device in which different jobs are generated at different stages of the printing process, capable of providing information of a job generated at one stage of a printing process in connection with information of a job generated at another stage of the printing process, an image processing device that prints document data based on a printing request from the printing processing device, and a document management device that provides the printing processing device with the document data to be printed by the image processing device.

According to a first aspect of the present invention, there is provided a printing processing device that controls a printing job according to a stage of a printing process and provides a client device with information of the printing job. The printing job is generated corresponding to a printing request from the client device connected to the printing processing device via a network. The printing processing device includes a job information providing unit that provides the client device, in response to an information providing request from the client device for providing information of the printing job, with first job state identification information and second job state identification information in connection with the first job state identification information. The first job state identification information is used for identifying a state of a first-stage job generated at a first stage of the printing process, and the second job state identification information is used for identifying a state of a second-stage job generated at a second stage of the printing process. The second-stage job is generated from the first-stage job and has a job granularity different from the job granularity of the first-stage job.

According to the printing processing device of the present invention, it is possible to provide, in response to a request from the client device, a client with job information of a first-stage job and a second-stage job in connection with each other.

According to a second aspect of the present invention, there is provided an image processing device for executing a printing process in response to a request from a printing processing device. The printing processing device controls a printing job according to a stage of a printing process and provides a client device with information of the printing job, said printing job being generated corresponding to a printing request from the client device connected to the printing processing device via a network. The printing processing device includes a job information providing unit that provides the client device, in response to an information providing request from the client device for providing information of the printing job, with first job state identification information and second job state identification information in connection with the first job state identification information. The first job state identification information is used for identifying a state of a first-stage job generated at a first stage of the printing process, the second job state identification information is used for identifying a state of a second-stage job generated at a second stage of the printing process, and the second-stage job is generated from the first-stage job and has a job granularity different from the job granularity of the first-stage job.

According to a third aspect of the present invention, there is provided a document management device that manages a plurality of document files and transmits predetermined document files to a printing processing device in response to a request from the printing processing device. The printing processing device is to instruct an image processing device to print the predetermined document files. The printing processing device controls a printing job according to a stage of a printing process and provides a client device with information of the printing job, the printing job being generated corresponding to a printing request from the client device connected the printing processing device via a network. The printing processing device includes a job information providing unit that provides the client device, in response to an information providing request from the client device for providing information of the printing job, with first job state identification information and second job state identification information in connection with the first job state identification information. The first job state identification information is used for identifying a state of a first-stage job generated at a first stage of the printing process, the second job state identification information being used for identifying a state of a second-stage job generated at a second stage of the printing process, the second-stage job being generated from the first-stage job and having a job granularity different from the job granularity of the first-stage job.

According to a fourth aspect of the present invention, there is provided a printing processing system having a printing processing device that controls a printing job according to a stage of a printing process; and a displaying data generating device that generates displaying data for displaying information of the printing job from the printing processing. The printing processing device includes a job information providing unit that provides the displaying data generating device, in response to an information providing request from the displaying data generating device for providing information of the printing job, with first job state identification information and second job state identification information in connection with the first job state identification information. The first job state identification information is used for identifying a state of a first-stage job generated at a first stage of the printing process, the second job state identification information is used for identifying a state of a second-stage job generated at a second stage of the printing process, and the second-stage job is generated from the first-stage job and has a job granularity different from the job granularity of the first-stage job. The displaying data generating device includes a data generating unit that generates the displaying data for displaying a state of the first-stage job and a state of the second-stage job based on the first job state identification information and the second job state identification information.

According to a fifth aspect of the present invention, there is provided a method of controlling a printing processing device to control a printing job according to a stage of a printing process and provide a client device with information of the printing job, said printing job being generated corresponding to a printing request from the client device connected to the printing processing device via a network. The method includes a step of providing the client device, in response to an information providing request from the client device for providing information of the printing job, with first job state identification information and second job state identification information in connection with the first job state identification information. The first job state identification information is used for identifying a state of a first-stage job generated at a first stage of the printing process, the second job state identification information is used for identifying a state of a second-stage job generated at a second stage of the printing process, the second-stage job being generated from the first-stage job and having a job granularity different from a job granularity of the first-stage job.

According to a sixth aspect of the present invention, there is provided a program executable in a computer for controlling a printing processing device to control a printing job according to a stage of a printing process and provide a client device with information of the printing job, said printing job being generated corresponding to a printing request from the client device connected to the printing processing device via a network. The program controls the printing processing device to execute a step of providing the client device, in response to an information providing request from the client device for providing information of the printing job, with first job state identification information and second job state identification information in connection with the first job state identification information. The first job state identification information is used for identifying a state of a first-stage job generated at a first stage of the printing process, the second job state identification information is used for identifying a state of a second-stage job generated at a second stage of the printing process, the second-stage job being generated from the first-stage job and having a job granularity different from a job granularity of the first-stage job.

According to a seventh aspect of the present invention, there is provided a storage medium for storing a program executable in a computer for controlling a printing processing device to control a printing job according to a stage of a printing process and provide a client device with information of the printing job, said printing job being generated corresponding to a printing request from the client device connected to the printing processing device via a network. The program controls the printing processing device to execute a step of providing the client device, in response to an information providing request from the client device for providing information of the printing job, with first job state identification information and second job state identification information in connection with the first job state identification information. The first job state identification information is used for identifying a state of a first-stage job generated at a first stage of the printing process, the second job state identification information is used for identifying a state of a second-stage job generated at a second stage of the printing process, the second-stage job being generated from the first-stage job and having a job granularity different from the job granularity of the first-stage job.

These and other objects, features, and advantages of the present invention will become more apparent from the following detailed description of preferred embodiments given with reference to the accompanying drawings.

BRIEF DESCRIPTION OF THE DRAWINGS

FIG. 9 is a screen view of an example of the setting page;

FIG. 11 is a table for schematically showing an example of the printing job status information;

FIG. 15 is a table for schematically showing an example of the spooler job status information;

FIG. 18 is a table for schematically showing the spooler job status information registered with the newly created spooler job status file 133 corresponding to the newly generated spooler job;

FIG. 19 is table for schematically showing the job correspondence table 135 including an additional record for registering relation between the newly generated spooler job and the printing job;

FIG. 20 is a table for schematically showing an example of the updated printing job status information in the printing job status file;

FIG. 21 is a table schematically showing an example of the printer job status information in the printer job status file 134;

FIG. 22 is a table schematically showing the spooler job status information, updated by printer job processing, in the spooler job status file 133;

FIG. 24 is a table schematically showing the status information in the printing job status file, updated by printer job processing, in the spooler job status file 133;

FIG. 28 is table for schematically showing an interface of the job status acquisition function of the printing request reception section 112;

FIG. 29 shows an example of the SOAP message transmitted to the printing request reception section 112 when the Web application 32 calls out the job status acquisition function;

FIG. 31 shows an example of the SOAP message including the returning information of the job status acquisition function;

FIG. 32 is a screen view schematically showing an example of the job list page;

FIG. 33 shows an example of the SOAP message transmitted to the printing request reception section 112 when the Web application 32 calls out the job status acquisition function;

FIG. 34 shows an example of the SOAP message including the returning information of the job status acquisition function;

FIG. 35 is a screen view schematically showing an example of the job list page displaying job status information of spooler jobs;

FIG. 36 is a screen view schematically showing an example of the job list page displaying job status information of printer jobs;

FIG. 39 is a screen view schematically showing an example of the job list page after cancellation operation on the document 1 job.

DESCRIPTION OF THE PREFERRED EMBODIMENTS

Below, preferred embodiments of the present invention are explained with reference to the accompanying drawings.

Figure 1:
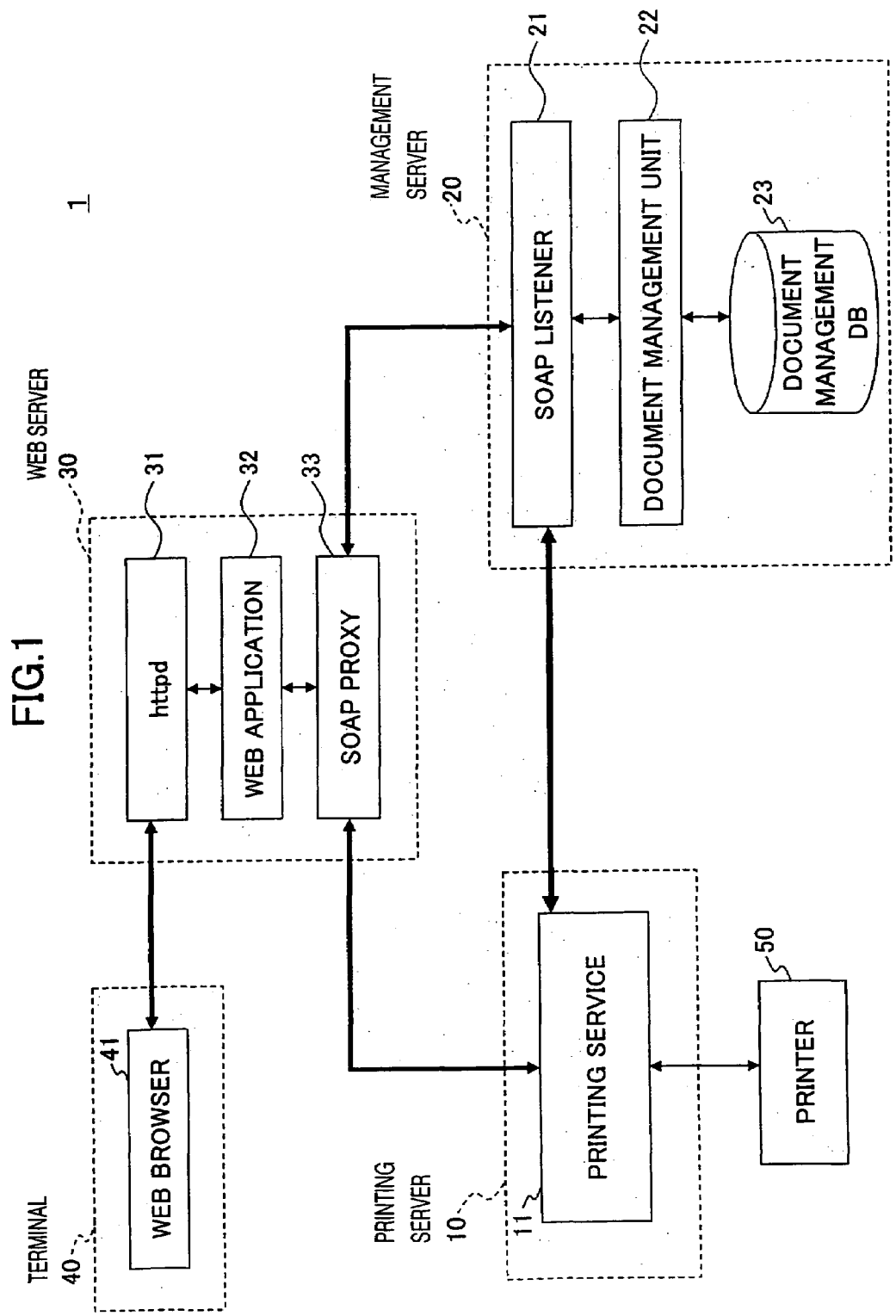
FIG. 1 is a block diagram of a configuration of a printing system 1 according to an embodiment of the present invention.

FIG. 1 is a block diagram of a configuration of a printing system 1 according to an embodiment of the present invention.

As illustrated in FIG. 1, the printing system 1 includes a printing server 10, a document management server 20, a Web server 30, and a terminal 40. The printing server 10, the document management server 20, the Web server 30, and the terminal 40 are connected to the Internet, a LAN, or other wireless or cable networks.

The printing server 10 is a computer that provides a printing service for printing document data on a printer 50. For example, the printing server 10 provides the printing service as a Web service.

The document management server 20 is a computer that provides a service, also as a Web service, for managing document data. For example, the document management server 20 includes a SOAP (Simple Object Access Protocol) listener 21, a document management unit 22, and a document management DB (database) 23. The SOAP listener 21 is a module capable of calling out functions of the document management unit 22 by RPC (Remote Procedure Call) in SOAP. The document management unit 22 is a module that provides an interface for operating the document management DB 23. For example, the document management unit 22 has a function of acquiring document data from the document management DB 23, a function of acquiring a list of information of document data, and a function of registering document data with the document management DB 23. The document management DB 23 is a database for storing document data.

The Web server 30 is a server that presents the service of the printing server 10 and the service of the document management server 20 as Web pages. For example, the Web server 30 may include a httpd (Hyper Text Transfer Protocol Deamon) 31, a Web application 32, and a SOAP proxy 33. The httpd 31 is a deamon for controlling HTTP communication between the Web server 30 and the terminal 40. When the httpd 31 receives a HTTP request from the terminal 40, the Web application 32 corresponding to the URL (Uniform Resource Locator) specified in the HTTP request is called out, and the output of the Web application 32 is transmitted to the terminal 40 as a Web page.

The Web application 32 is an application chiefly for creating a Web page. The Web application 32 requests the printing server 10 or the document management server 20 for desired processing when necessary, and generates a Web page displaying the results given by the printing server 10 or the document management server 20. For example, the Web application 32 generates a Web page to display a list of the document data managed in the document management DB 23 (below, referred to as "document list page").

The SOAP proxy 33 is a module for providing interface to the Web application 32 in order for the Web application 32 to call out functions of the printing server 10 and the document management server 20 by RPC (Remote Procedure Call) in SOAP. Due to the SOAP proxy 33, the Web application 32 is capable of transparently calling out functions of the printing server 10 and the document management server 20 without being aware of the network communication.

In FIG. 1, although the Web application 32 is illustrated as a single block, there may be a number of the Web applications 32. For example, the modules for generating the document list page and other Web pages may have separate source codes.

The terminal 40 may be any terminals capable of communication, which provides an interface (a Web page) by a Web Browser 41 to allow a user to use the printing system 1. For example, the terminal 40 may be a PC (Personal Computer), a PDA (Personal Digital Assistants), or a mobile phone.

In FIG. 1, although the terminal 40 and the printer 50 are each illustrated as a single block, there may be a number of the terminals 40 and the printers 50.

Below, the printing service 11 of the printing server 10 is described in detail.

Figure 2:
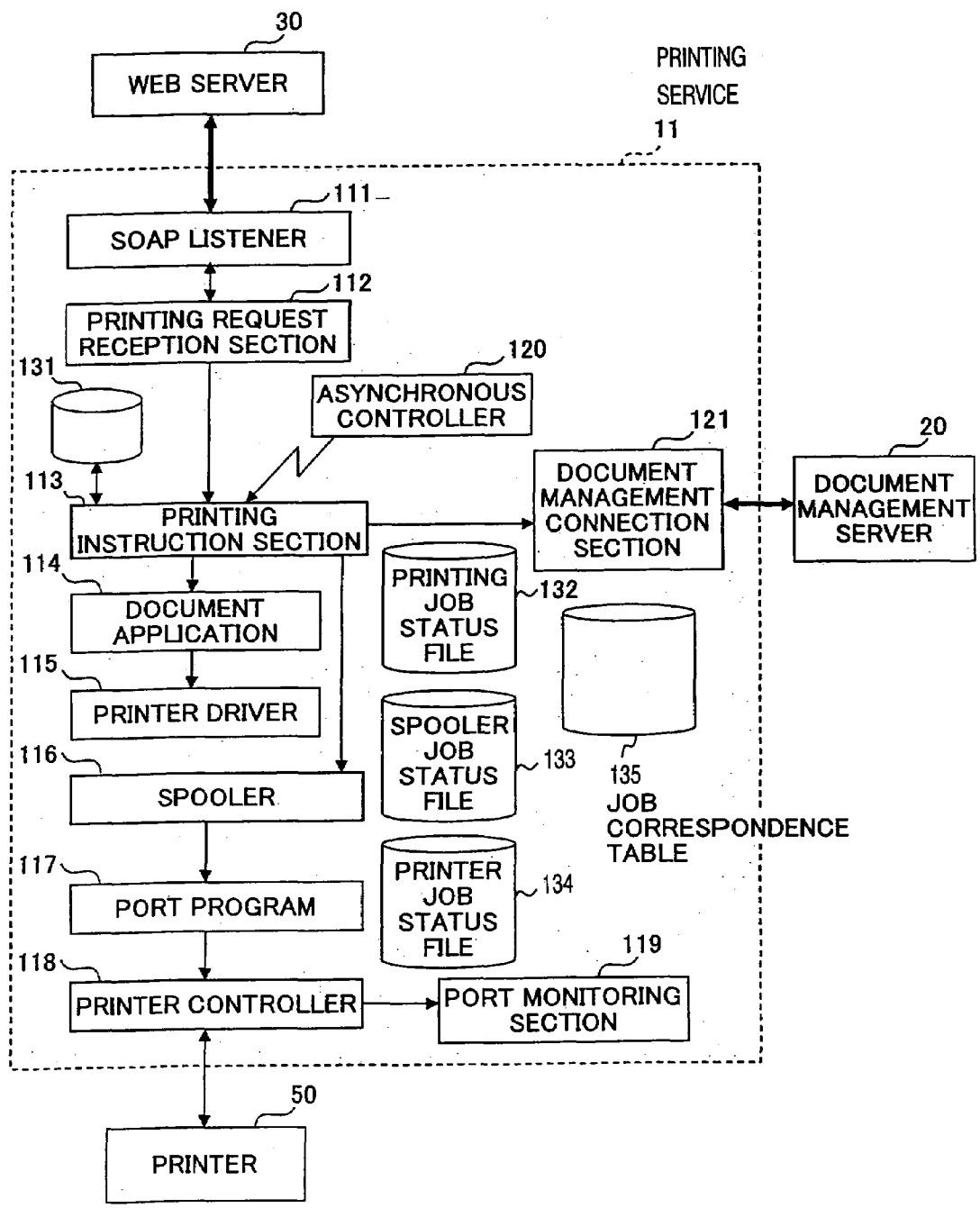
FIG. 2 is a block diagram showing a functional configuration of the printing service 11 of the printing server 10.

FIG. 2 is a block diagram showing a functional configuration of the printing service 11 of the printing server 10.

As illustrated in FIG. 2, the printing service 11 includes a SOAP listener 111, a printing request reception section 112, a printing instruction section 113, a document application 114, a printer driver 115, a spooler 116, a port program 117, a printer controller 118, a port monitoring section 119, an asynchronous controller 120, a document management connection section 121, and a printing job queue 131.

The SOAP listener 111 is a module capable of calling out functions of the printing request reception section 112, described below, from the Web server 30 or others by RPC in SOAP.

The printing request reception section 112 is a module having the functions to be provided by the printing service 11. These functions of the printing request reception section 112 can be called out by the RPC in SOAP. For example, the printing request reception section 112 has a function of receiving a request of printing document data by function calls, and a function of acquiring status data of jobs generated based on the printing request. By calling out functions of the printing request reception section 112 by RPC in SOAP, system configuration in an Internet environment becomes easy on the side of the client.

The printing instruction section 113 is a module for issuing instructions, in response to the printing request from the printing request reception section 112, to the document application 114 for printing document data. Below, a job related to a printing instruction from the printing request reception section 112 is referred to as "a printing job".

The printing instruction section 113 does not execute the printing job right after receiving the printing request from the printing request reception section 112. As described below, by utilizing the asynchronous controller 120 and the printing job queue 131, the printing instruction section 113 executes the printing job in an asynchronous manner relative to the printing request.

The asynchronous controller 120 is a program for regularly urging the printing instruction section 113 to execute printing jobs, and is started as an independent process.

The printing job queue 131 is a file for temporarily storing information for defining the content of a printing job (below, referred to as "printing job information"), which is included in the printing request received by the printing instruction section 113 from the printing function of the printing request reception section 112.

The document application 114 is an application for creating or editing document data, for example, it may be word-processing software, spread sheet software, or others.

The printer driver 115 converts document data into printing data having a format which the destination printer 50 is able to process. For example, the printer driver 115 may be the printer driver attached when purchasing the printer.

The spooler 116 temporarily stores the printing data generated by the printer driver 115, and transmits the printing data to the port program 117 sequentially. For example, the spooler 116 may be the spooler provided by the Windows (registered trademark) OS.

The port program 117 transmits the printing data to the printer controller 118, but not the printer. Generally, a port program is equivalent to a module called as "port monitor" provided by the OS, which transmits the printing data directly to the printer from the spooler. In this embodiment, however, the port program 117 is a separate one from the port monitor.

It should be noted that the Windows (registered trademark) OS provides a function of calling out separately executed modules from the spooler, instead of the port monitor provided in advance. The port program 117 may also be called out from the spooler 116 by utilizing this function.

The printer controller 118 is a program for constantly monitoring the state of the printer 50 and transmitting the printing data from the port program 117 to the printer 50. When the printer controller 118 transmits the printing data to the printer 50 (that is, sends a printing request to the printer 50), or when states of jobs in the printer 50 change, the printer controller 118 notifies the port monitoring section 119 of these facts.

The port monitoring section 119 is a program for executing appropriate operations in response to the notification from the printer controller 118.

The document management connection section 121 is a module for providing an interface used for calling out, by RPC (Remote Procedure Call) in SOAP, functions of the document management unit 22 of the document management server 20.

In the printing server 10, multiple types of jobs in series are generated according to the stages of a printing process executed based on one printing request. One of them is the aforesaid printing job, which is processed by the printing instruction section 113. Another one is the job processed by the spooler 116. Below, the job processed by the spooler 116 is referred to as "spooler job". Further, jobs are also generated in the printer controller 118. Below, the job generated in the printer controller 118 is referred to as "printer job".

In the above paragraph, the expression "jobs in series" means that the above three types of jobs are not generated from independent events; but each of them is generated from the job at the preceding stage of the printing process. Specifically, the spooler job is generated based on the printing job, the printer job is based on the spooler job. In this embodiment, this serial relation of the jobs is referred to as "parent-child relation", and thus, the printing job is the parent job of the spooler job, and the spooler job is the sub-job of the printing job. Similarly, the spooler job is the parent job of the printer job, and the printer job is the sub-job of the spooler job.

In the printing service 11 illustrated in FIG. 2, printing job status file 132, the spooler job status file 133, and the printer job status file 134 are for managing status information of the printing job, the spooler job, and the printer job, respectively, and are created each time a job is generated.

The job correspondence table 135 in FIG. 2 is a table for managing the connection between the three types of jobs.

Below, hardware of the printing service 11 of the printing server 10 is described.

Figure 3:
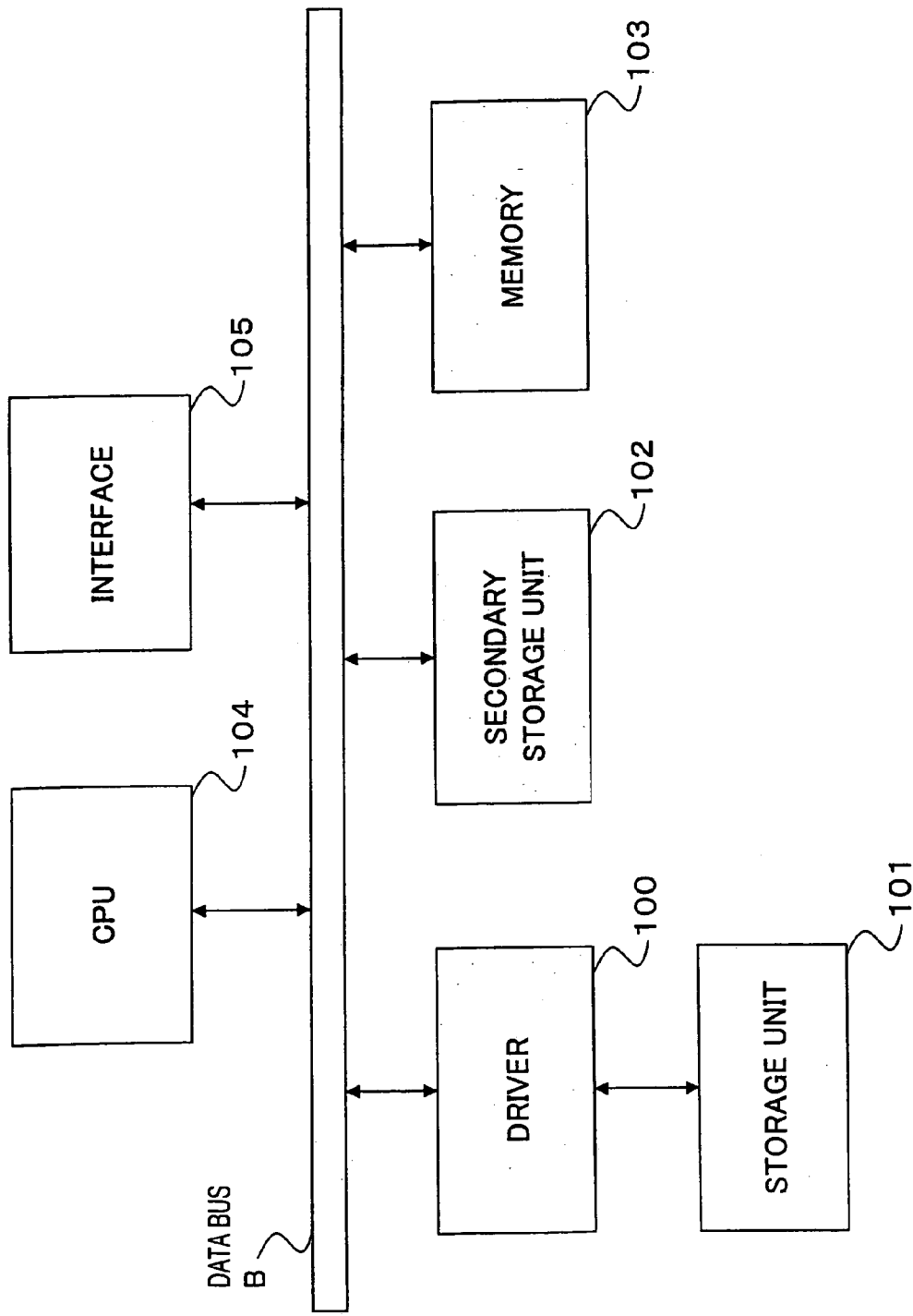
FIG. 3 is a block diagram showing a hardware configuration of the printing service 11 of the printing server 10.

FIG. 3 is a block diagram showing a hardware configuration of the printing service 11 of the printing server 10.

As illustrated in FIG. 3, the printing server 10 includes a driver 100, a storage unit 101, a secondary storage unit 102, a memory 103, a CPU 104, an interface 105, and data bus B.

In the printing server 10, the program for generating the printing data is stored in the storage unit 101, such as a CD-ROM. When the storage unit 101 is set in the driver 100, the program is installed into the secondary storage unit 102 from the storage unit 101 through the driver 100.

The secondary storage unit 102 stores the installed program, and other files and data necessary to processing.

The memory 103 reads the program in the secondary storage unit 102 and stores therein when an instruction of starting the program is issued.

The CPU 104 executes the program in the memory 103 to realize the functions of the printing server 10.

The interface 105 is for connection with the network, and may be a modem, or a router.

The document management server 20 and Web server 30 may have the similar hardware configurations as the printing server 10 illustrated in FIG. 3.

Below, with reference to a sequence diagram illustrated in FIG. 4 through FIG. 7, an explanation is given to the operational procedure of the printing system 1 illustrated in FIG. 1 and FIG. 2.

Figure 4:
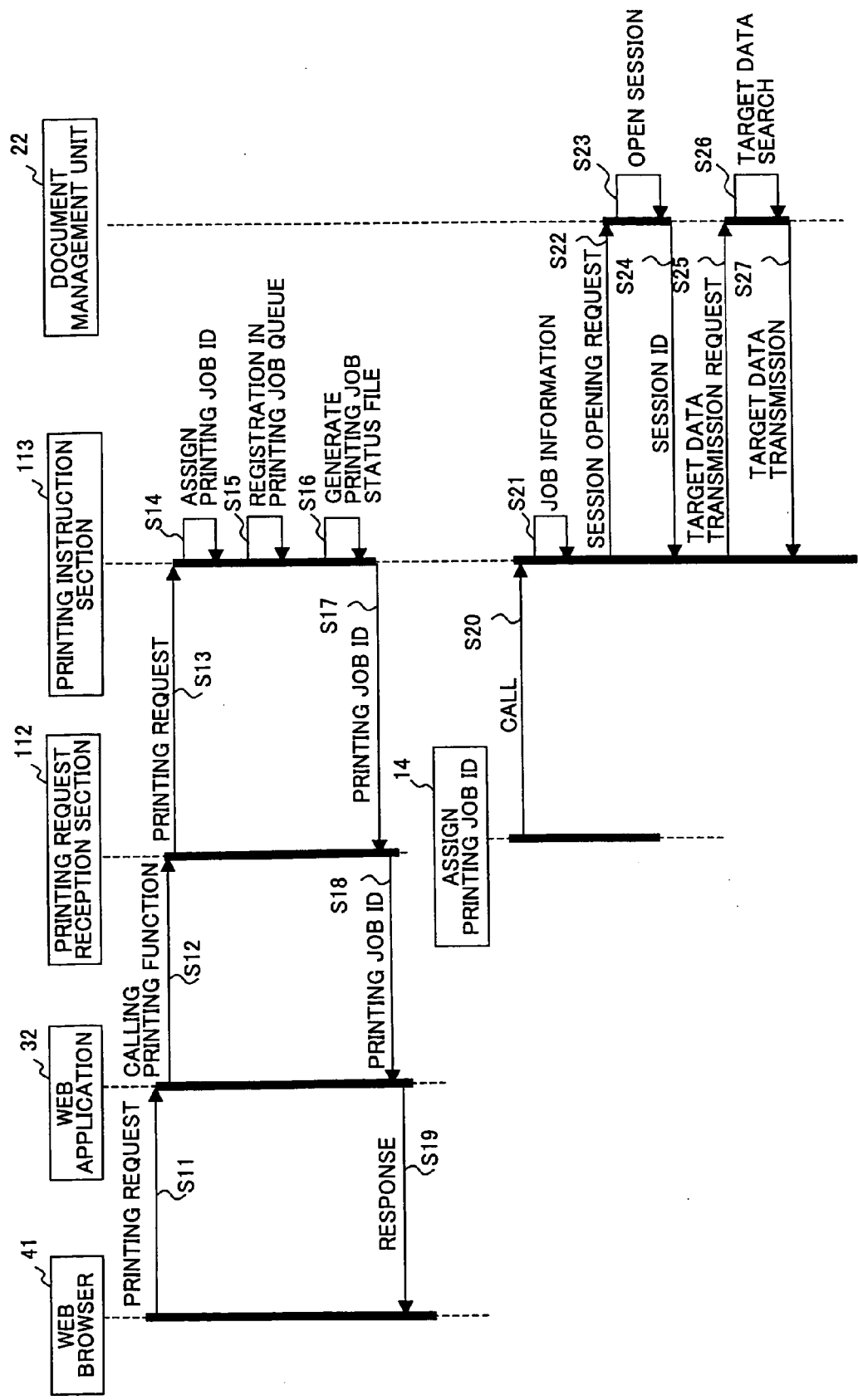
FIG. 4 is a sequence diagram showing a process of printing document data in the printing system 1.

FIG. 4 is a sequence diagram showing a process of printing document data in the printing system 1.

In step S11, a user of the terminal 40 selects document data to be printed in the document list page displayed by the Web browser 41. Below, the document data to be printed is referred to as "target data". After selecting the target data, the user sets parameters used in a printing process in a setting page, and upon that, the Web browser 41 transmits a request of printing the target data to the Web server 30. Below, the parameters used in a printing process are referred to as "printing parameters".

Figure 8:
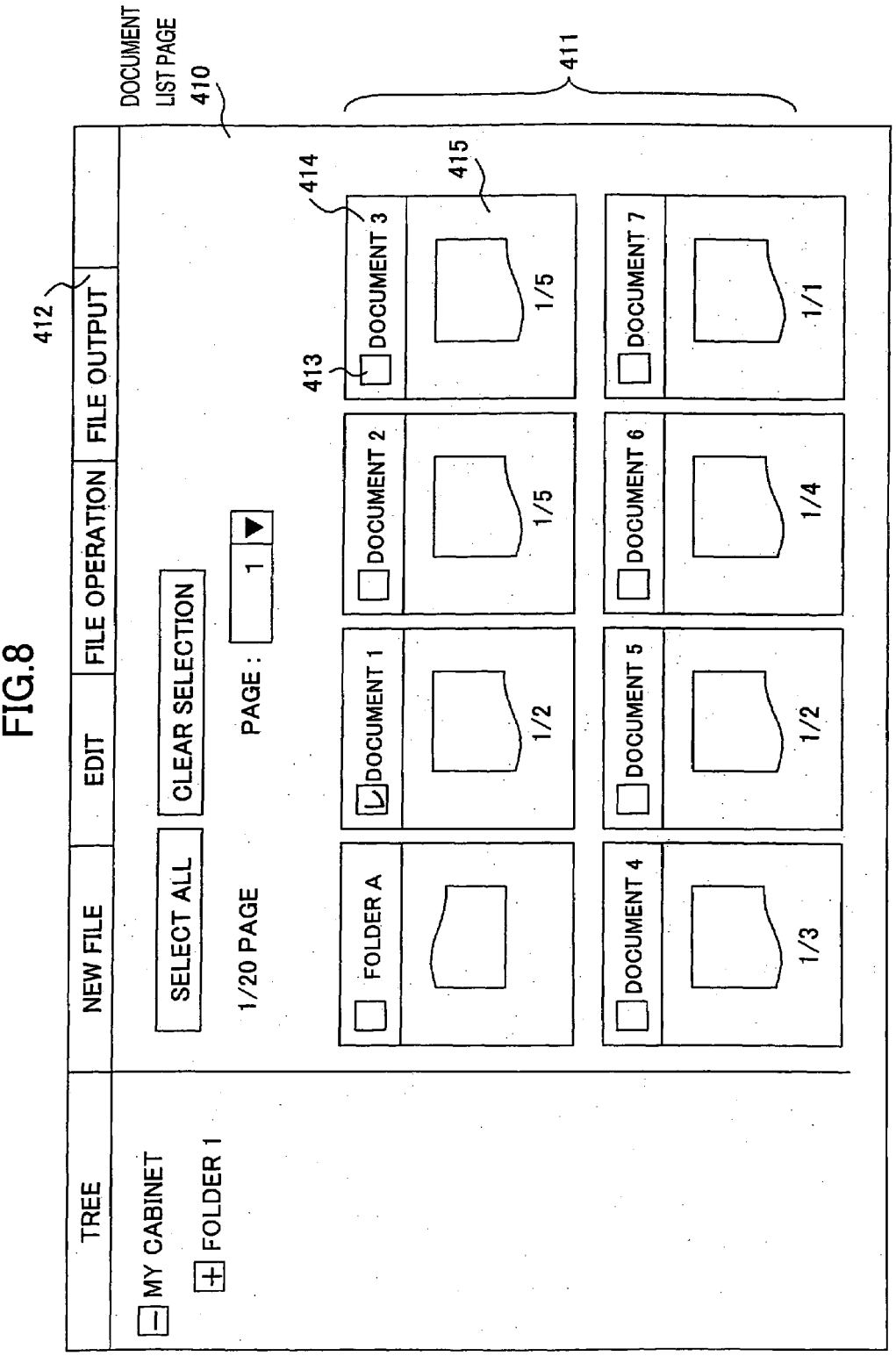
FIG. 8 is a screen view of an example of the document list page.

FIG. 8 is a view of an example of the document list page.

As illustrated in FIG. 8, the document list page 410 is displayed after the user inputs the URL of the document list page 410 into the Web browser 41. That is, after the Web browser 41 sends a request of transmitting the document list page 410 to the Web server 30 according to the URL of the document list page 410 input by the user, the Web application 32 in the Web server 30 reads out document list information in a certain folder of the document management DB 23 through the document management unit 22 of the document management server 20. The Web application 32 generates the document list page 410 including the obtained list of the document data. The document list page 410 generated by the Web application 32 is transmitted to the terminal 40 by the httpd 31, and displayed by the Web browser 41.

In the document list page 410, in an area 411, the document data are shown in forms of thumbnails. In the document list page 410, a rectangular region showing one set of document data is called a "cell", and each cell includes a check button for selecting the document data, a document name region for displaying the name of the document data, and an icon region. For example, in the cell, whose document name is "document 3", there are a check button 413, a document name region 414, and an icon region 415.

In the icon region, the number of document files forming the document data and the order number of the document file presently being displayed as the icon are shown in a manner of a fraction number. For example, in the icon region 215 of the cell whose document name is "document 1", a fractional number "½" is displayed. It means that the document 1 includes two document files, and the first document file is presently being displayed as the icon.

That is, in the present embodiment, "document data" is a combination of one or more document files created by word-processing software. The document files of the same set of document data may be created by the same application, or by different applications, respectively. Below, each document file of a set of document data is referred to as a "session". That is, for example, the document 1 includes two sessions.

When the user checks the check button corresponding to the document data to be printed, that is, the target data, (in FIG. 8, the document 1 is checked), and clicks a document output menu 412, a menu "printing" (not illustrated) is selected. Upon that, a setting page is displayed in the Web browser 41.

FIG. 9 is a view of an example of the setting page.

As illustrated in FIG. 9, the setting page 420 includes a target document display region 421 and a printing state setting region 422. In the target document display region 421, the document name list of the target data selected in the document list page 410 for printing is displayed.

In the printing state setting region 422, the user is allowed to set a target printer, a target session, a size of paper, a printing direction, and a starting printing position. After setting printing parameters in the setting page 420, the user clicks the OK button 423. Upon that, the Web browser 41 transmits the aforesaid printing request to the Web server 30 together with the printing parameters.

In step S12, after calling out the printing function of the printing request reception section 112 of the printing server 10 by the RPC in SOAP, the Web application 32 of the Web server 30 requests to print the target data. The arguments of the printing function are set to take values of the printing parameters set in the setting page 420.

In step S13, the printing request reception section 112 of the printing server 10 requests the printing instruction section 113 to print the target data.

In step S14, the printing instruction section 113 assigns a job ID, which is information for uniquely identifying a printing job to be executed in response to a printing request. Below, a job ID of a printing job is referred to as "printing job ID". For example, the printing-job ID is set to be "001", and this printing job is abbreviated to be "printing job 001" below.

In step S15, the printing instruction section 113 registers the printing job ID and the printing parameters, which are specified as the arguments of the printing function of the printing request reception section 112, with the printing job queue 131 as printing job information.

Figure 10:
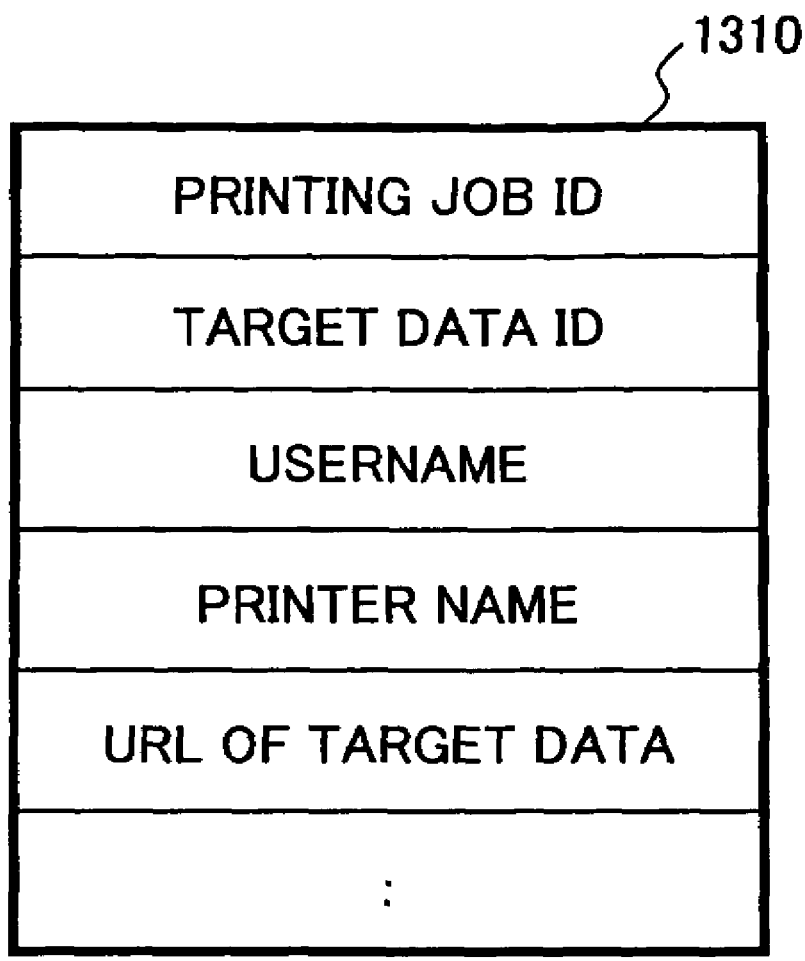
FIG. 10 is a table for schematically showing an example of the printing job information.

FIG. 10 is a view for schematically showing an example of the printing job information.

As illustrated in FIG. 10, the printing job information 1310 includes a printing job ID, a target data ID, a user name, a printer name, and a URL of the target data.

The printing job ID is that described in step S14. The target data ID is the unique identification code of the target data. The user name is the unique identification code of the user of the terminal 40, which made the printing request, in the printing system 1. The printer name is the unique identification code of the printer 50. The URL of the target data is the URL (address information) of the server in which the target data is stored, that is, the document management server 20.

Although not illustrated in FIG. 10, the printing job information 1310 may also include the printing parameters set in the setting page 420.

In step S16, the printing instruction section 113 generates the printing job status file 132, which manages status information of the printing job, and the initial values of the status information of the printing job 001 are registered with the printing job status file 132.

FIG. 11 is a view for schematically showing an example of the printing job status information. In FIG. 11, the left column contains the names of the items forming the printing job status information, and the right column contains values of the registered items as described in S16.

As illustrated in FIG. 11, the printing job status information includes the items of a printing job ID, a job status, a number of sub-jobs, a list of sub-jobs, a job entry time, a job name, a client name, and a flag.

The printing job ID is that described in step S14. The job status is a character string indicating a state of the printing job, corresponding to the "job state identification information" in the claims. In the example shown in FIG. 11, the job status is registered to be "pending", indicating-that the printing job is on standby in the printing job queue 131. The number of sub-jobs indicates the number of the sub-jobs already generated. The list of sub-jobs is a list of the job IDs of the sub-jobs already generated, also referred to as "sub-job ID". The job entry time indicates the entry time of the printing job. The job name is a unique identification code for the user to identify a job. In this example, the document name of the target data is used as the job name. The client name is the name of the terminal 40 that made the printing request. The flag indicates whether it is allowed to delete or abort a printing job. When the flag is TRUE, these operations are allowed, if it is FALSE, these operations are not allowed. Therefore, one printing job is generated in response to one printing request in the printing server 10.

In step S17, the printing instruction section 113 does not execute the printing job, but outputs the newly assigned printing job ID to the printing request reception section 112.

In step S18, the printing request reception section 112 transmits the printing job ID to the Web application 32, and the Web application 32 stores the printing job ID in the Web server 30 user by user. For example, the Web application 32 may use the printing job ID stored in the Web server 30 to confirm the state of a printing job.

In step S19, as a response to the printing request, the Web application 32 transmits a Web page displaying that the printing request is received. This Web page is referred to as "response page". The response page is displayed by the Web browser 41, and thereby, the user is able to confirm that the printing request is normally received.

In step S20, in the printing server 10, the asynchronous controller 120 regularly urges the printing instruction section 113 to execute the printing job.

In step S21, in response to the call from the asynchronous controller 120, the printing instruction section 113 makes reference to the printing job queue 131. Once printing job information is registered with the printing job queue 131, the printing instruction section 113 reads the printing job information. For example, the printing instruction section 113 obtains the printing job information of the printing job 001.

In step S22, in order to obtain the target data specified by the target data ID, which is included in the obtained printing job information (FIG. 10), from the document management unit 22 of the document management server 20 specified by the target data URL included in the obtained printing job information, the printing instruction section 113 calls out a session-opening function of the document management unit 22 by RPC in SOAP, and requests the document management unit 22 to open a session.

In step S23, the document management unit 22 opens a session with the printing instruction section 113.

In step S24, as a returning value of the session opening, the document management unit 22 transmits a session ID, uniquely identifying the session, to the printing instruction section 113.

In step S25, the printing instruction section 113 calls out a document acquisition function of the document management unit 22, and requests the document management unit 22 to transmit the target data.

In step S26, the document management unit 22 searches the document management DB 23 for the target data.

In step S27, the document management unit 22 transmits the target data to the printing instruction section 113.

Figure 5:
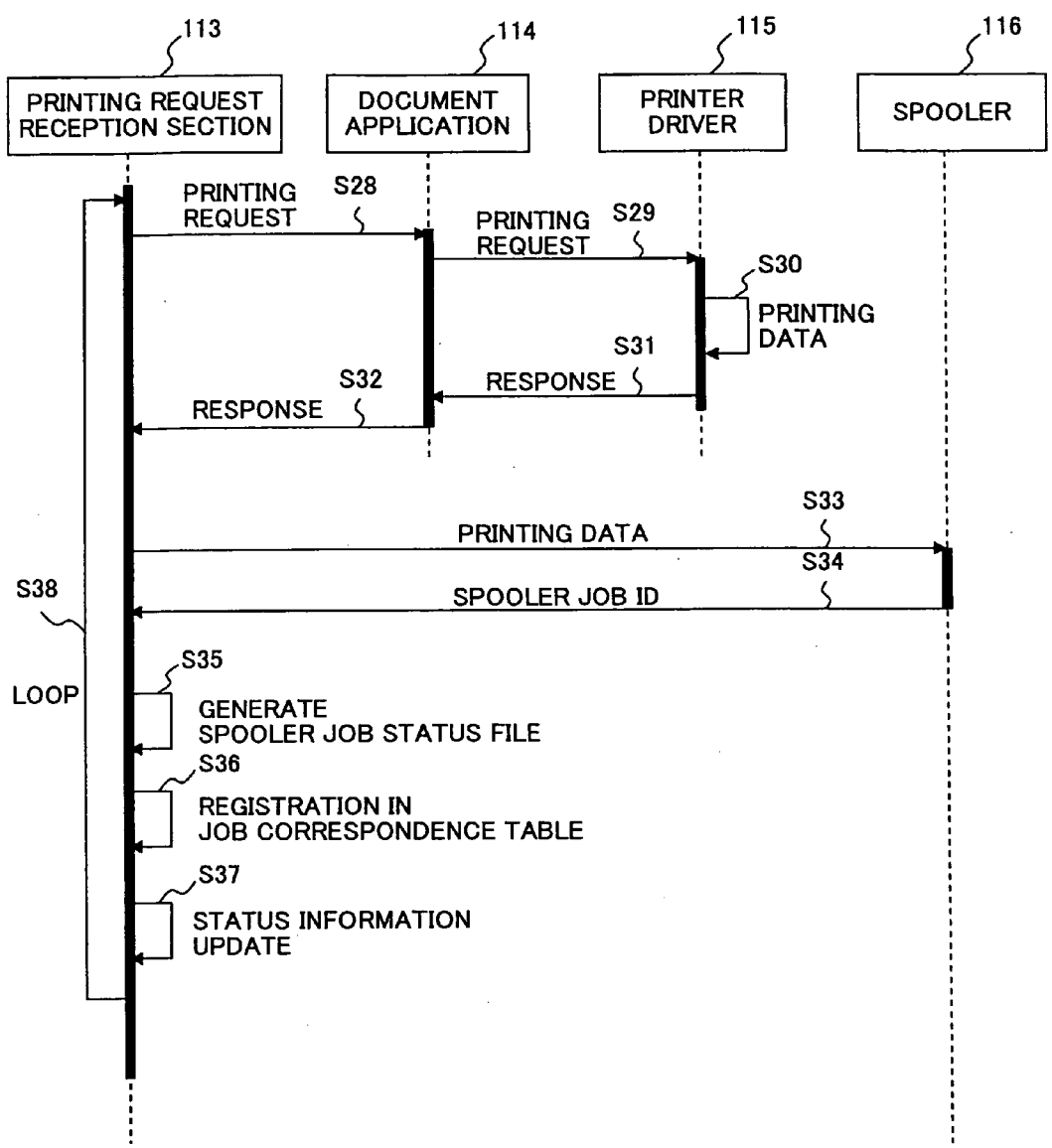
FIG. 5 is a sequence diagram, continued from the diagram in FIG. 4, showing the process of printing document data in the printing system 1.

FIG. 5 is a sequence diagram, continued from the diagram in FIG. 4, showing the process of printing document data in the printing system 1.

In step S28, the printing instruction section 113 extracts one document file from the target data transmitted from the document management server 20. Below, the extracted document file is referred to as "current document file". The printing instruction section 113 requests a document application 114 corresponding to the type of the current document file to print the current document file.

In step S29, the document application 114 requests the printer driver 115 to print the current document file.

In step S30, the printer driver 115 generates the printing data of the current document file and temporarily stores the printing data.

In steps S31 and S32, after the printing data are stored, control of the processing is returned to the printing instruction section 113.

In step S33, the printing instruction section 113 obtains the temporarily stored printing data, outputs the printing data to the spooler 116, and sends a printing request to the spooler 116.

Because the printing data are in the spooler 116, as a sub-job of the printing job 001, a new spooler job is generated in the spooler 116. The newly generated spooler job is referred to as "current spooler job".

It should be noted that the printing job and the spooler job may have different job granularities. A job granularity indicates an amount of information included in a job. Different job granularities indicate that the amount of information included in the job changes in the transition from a printing job to a spooler job.

Figure 12:
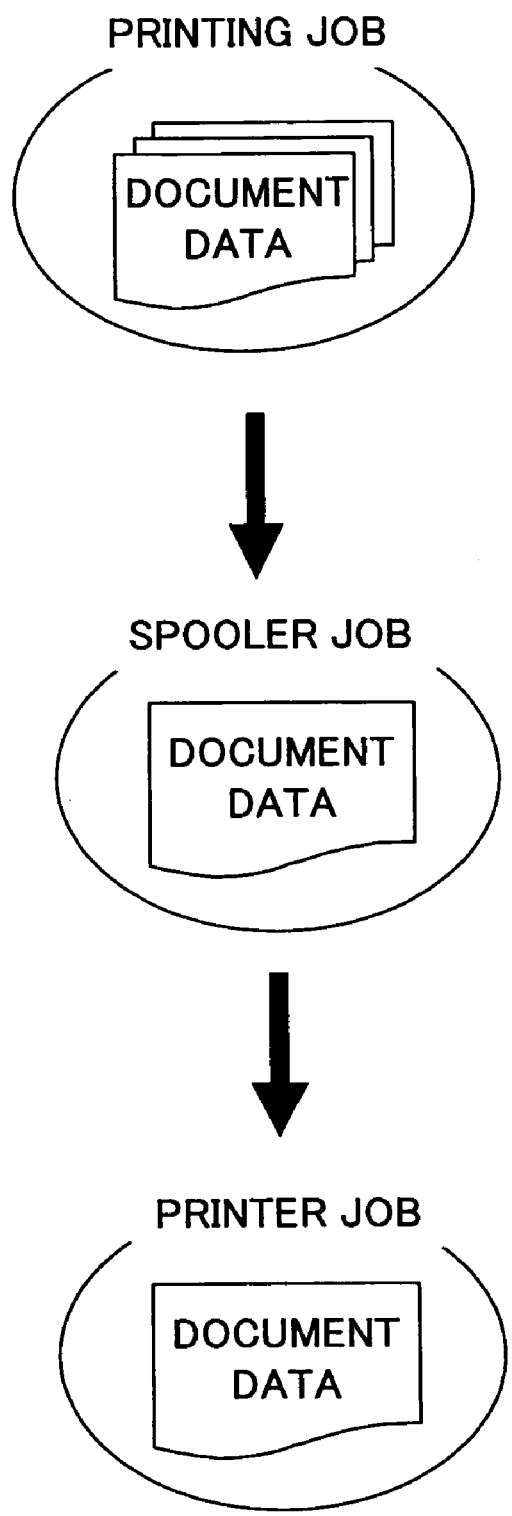
FIG. 12 is a schematic view showing operations of, upon a request of printing a number of documents, printing these documents at one time.
Figure 13:
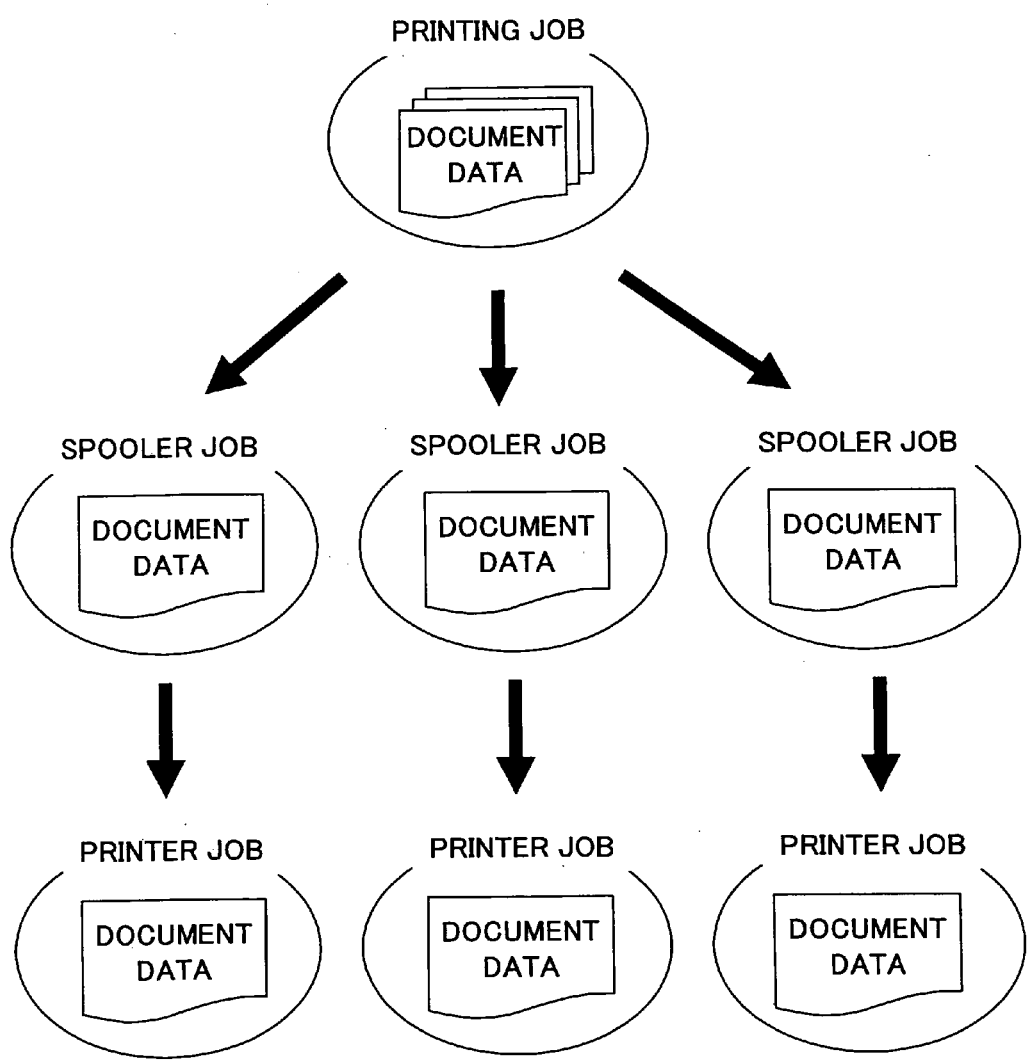
FIG. 13 is a schematic view showing operations of, upon a request of printing a number of documents, printing each of these documents separately.
Figure 14:
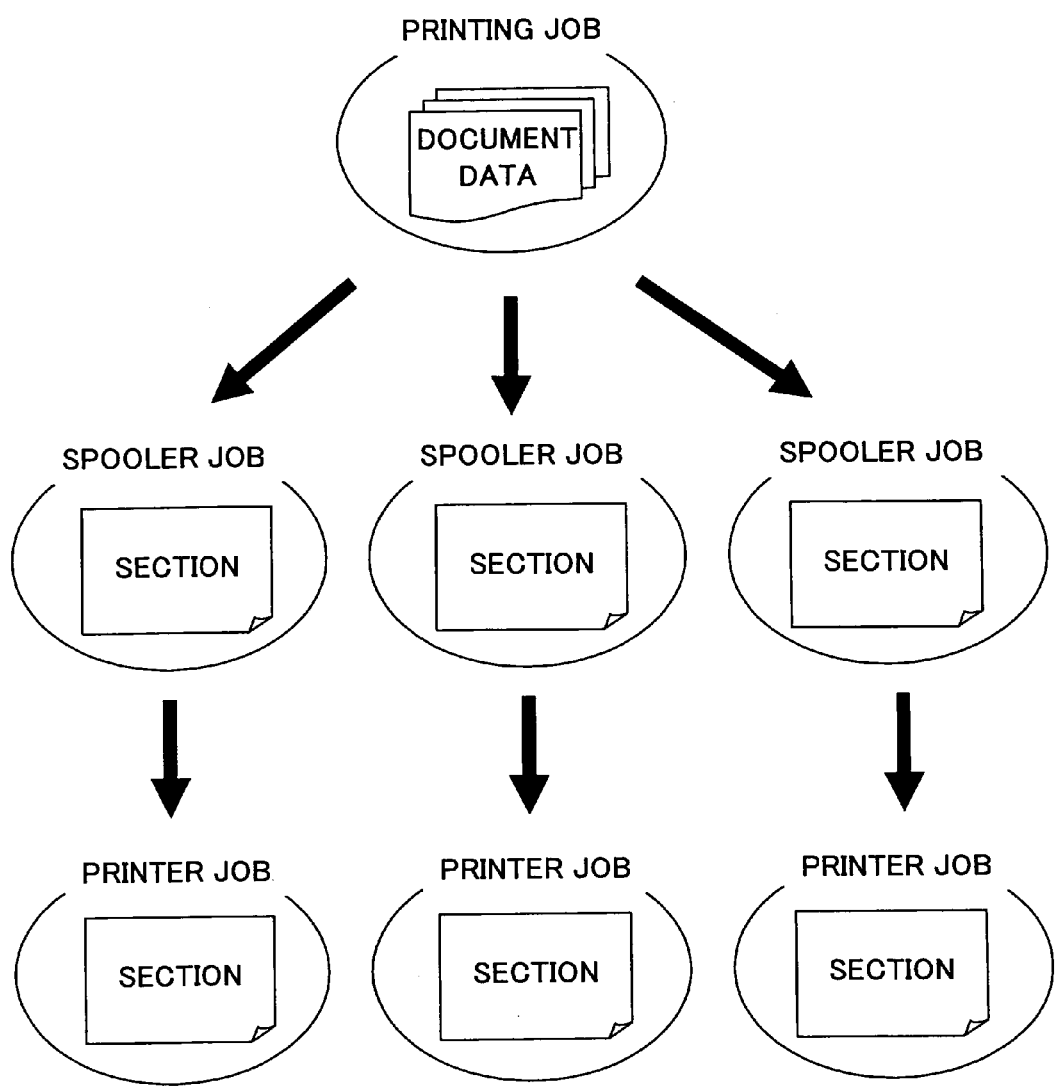
FIG. 14 is a schematic view showing operations of printing each session separately.

FIG. 12 through FIG. 14 shows relations of job granularities of the various jobs.

FIG. 12 is a schematic view showing operations of printing a number of documents at one time upon a request of printing these documents.

In this case, the job granularity is the same for all of the printing job, the spooler job, and the printer job. In other words, for all the documents which are requested to be printed, the printing job, the spooler job, and the printer job correspond to each other one-on-one.

FIG. 13 is a schematic view showing operations of printing each of a number of documents separately upon a request of printing these documents.

In this case, only one printing job is generated for all the documents which are requested to be printed, but the spooler jobs and the printer jobs of different documents are generated separately. That is, multiple spooler jobs are generated from one printing job.

FIG. 14 is a schematic view showing operations of printing each session separately.

In this case, only one printing job is generated for all the documents which are requested to be printed, but the spooler jobs and the printer jobs of different sessions are generated separately. That is, more spooler jobs, hence, smaller granularity than that in FIG. 13, are generated from one printing job. It is assumed that the present embodiment involves the case shown in FIG. 14.

In step S34, as a response to the printing request, the spooler 116 outputs a spooler job ID of the current spooler job to the printing instruction section 113. Because the spooler 116 executes the printing process in an asynchronous manner, in step S34, the response is made before the spooler 116 starts the printing process.

In step S35, the printing instruction section 113 generates the spooler job status file 133, which manages status information of the current spooler job, and registers the status information of the current spooler job with the generated spooler job status file 133.

FIG. 15 is a view for schematically showing an example of the spooler job status information. The same as FIG. 11, the left column in FIG. 15 contains the names of the items forming the spooler job status information, the right column contains values of the registered items, and the spooler job status information includes the items of spooler job ID, job status, number of sub-jobs, list of sub-jobs, job entry time, job name, client name, and flag.

As illustrated in FIG. 15, the job ID of the current spooler job (spooler job ID) is 10, an initial value of the job status is registered to be "processing", indicating that the spooler job is being processed by the spooler 116. The job name is "file A"; it is the file name of the document file from which the target data are created.

In step S36, the printing instruction section 113 registers the parent printing job 001 and the current spooler job (a sub-job of the printing job 001) with a job correspondence table 135.

Figure 16:
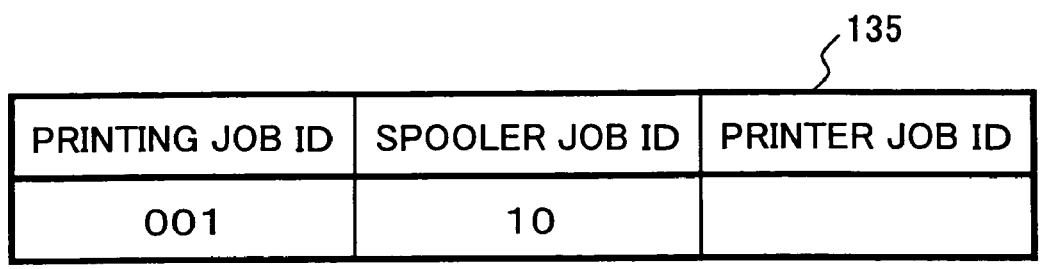
FIG. 16 is table for schematically showing an example of the job correspondence table 135.

FIG. 16 is view for schematically showing an example of the job correspondence table 135.

As illustrated in FIG. 16, the job correspondence table 135 includes the items of printing job ID, spooler job ID, and printer job ID, which possess parent-child relations, and values of these ID are stored in one line of the job correspondence table 135.

In the example shown in FIG. 16, the printing job ID of the printing job 001 and the spooler job ID of the current spooler job are registered, and the spooler job ID is 10. In this way, the printing job 001 and the spooler job 10 are managed in connection in the job correspondence table 135.

Because the printer job has not been generated so far, the printer job ID is not assigned a value.

In step S37, the printing instruction section 113 updates the status information registered with the printing job status file 132 (FIG. 11) for the printing job 001. This operation is described below.

Figure 17:
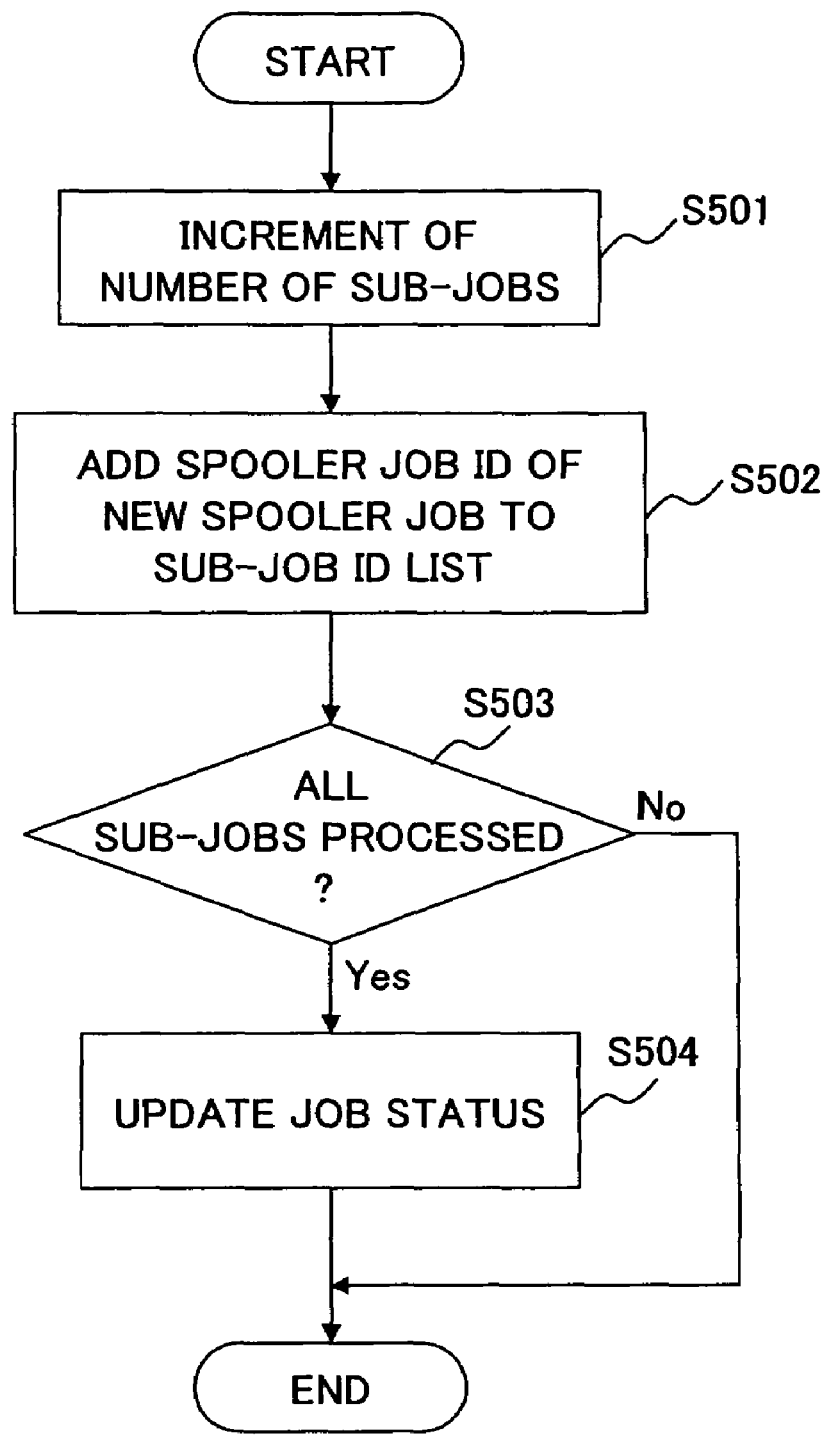
FIG. 17 is a flowchart for explaining the operation of updating the job status information.

FIG. 17 is a flowchart for explaining the operation of updating the job status information.

In step S501, the printing instruction section 113 increments the number of sub-jobs included in the status information. In this example, it is assumed that the number of sub-jobs becomes "1".

In step S502, the printing instruction section 113 adds the spooler job ID of the newly generated spooler job 10 to the list of the sub-job ID.

In step S503, the printing instruction section 113 determines whether all of the sub-jobs have been processed. Here, "processing a sub-job" means the operations in step S28 through S36 (FIG. 5), that is, processing of all the document files included in the target data.

If un-processed document files exist, the present procedure is finished.

If processing of the document files has been finished, the procedure proceeds to step S504.

In step S504, the value of the job status is updated from "pending" to "processing". That is, the value of the job status of the parent job is updated after the job statuses of all the sub-jobs are updated.

In the present embodiment, the document 1, which corresponds to the target data, includes two document files, and at the present time, only processing of the first document file (file A) is completed, that is, processing of all the document files has not been finished, therefore, step S504 is not executed.

Returning to FIG. 5 in step S38, the printing instruction section 113 repeatedly executes steps S28 through S37 for residual document files included in the target data. Therefore, in the present embodiment, one more spooler job is generated based on the printing job 001. As a result, one more spooler job status file 133 is created, and a new record is added to the job correspondence table 135.

FIG. 18 is a view for schematically showing the spooler job status information registered with the newly created spooler job status file 133 corresponding to newly generated spooler job.

As illustrated in FIG. 18, the spooler job ID of the newly generated spooler job is 20, the job name is "file B", and the initial value of the job status is registered to be "processing", the same as the spooler job 10 in FIG. 15.

FIG. 19 is view for schematically showing the job correspondence table 135 including an additional record for registering relation between the newly generated spooler job and the printing job.

As illustrated in FIG. 19, there is an additional record for the spooler job ID 20. According to the job correspondence table 135 in FIG. 19, there is only one printing job 001, but there are two spooler jobs 10 and 20, which are sub-jobs of the printing job 001.

Further, after processing of all the document files included in the target data is finished, as described in step S504 in FIG. 17, the value of the job status of the parent job is updated.

FIG. 20 is a view for schematically showing an example of the updated printing job status information in the printing job status file.

As illustrated in FIG. 20, the job status is updated from "pending" to "processing". The number of sub-jobs is updated to be "2", and in the list of sub-jobs, spooler job IDs of the spooler job 10 and the spooler job 20 are registered.

In this way, spooler jobs based on the printing job 001 are put in the spooler 116, and subsequently, the spooler jobs are processed in the spooler 116.

Figure 6:
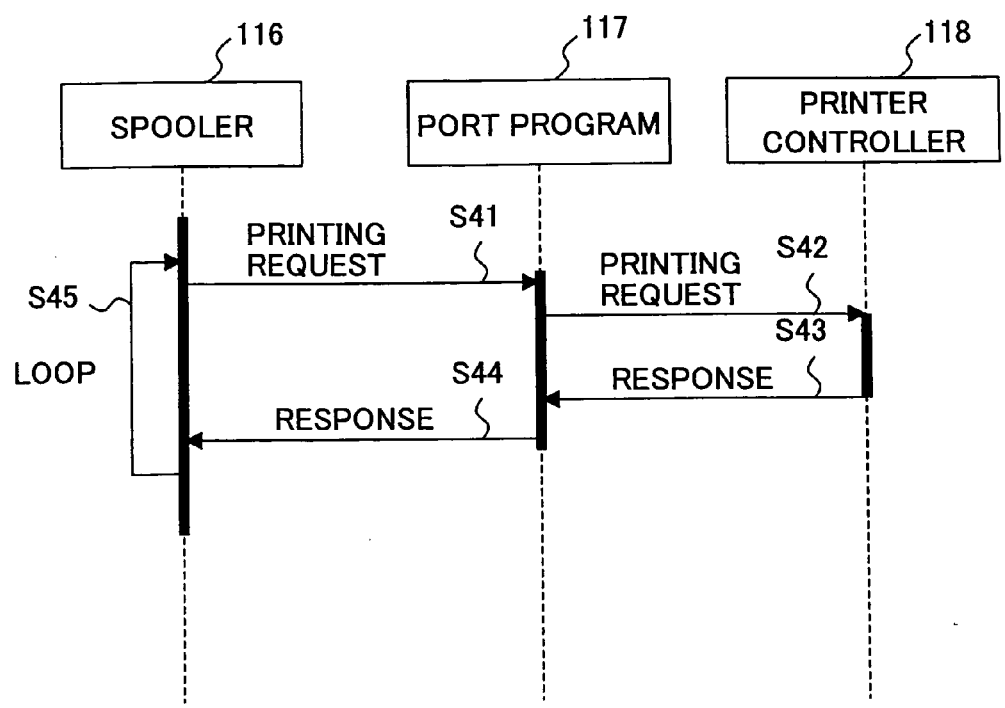
FIG. 6 is a sequence diagram, continued from the diagram in FIG. 5, showing the process of printing document data in the printing system 1.

FIG. 6 is a sequence diagram, continued from the diagram in FIG. 5, showing the process of printing document data in the printing system 1.

In step S41, the spooler 116 transmits a printing request to the port program 117 for one of the spooler jobs. Along with the printing request, the spooler 116 transmits the printing data and the spooler job ID to the port program 117.

In step S42, the port program 117 makes a printing request to the printer controller 118, and along with the printing request, the port program 117 transmits the printing data and the spooler job ID to the printer controller 118.

Based on the printing request, the printer controller 118 generates a new printer job as a sub-job of the spooler job. In the present embodiment, it is assumed that one spooler job corresponds to one printer job. The printer controller 118 makes the printer job in connection with the spooler job for management.

In step S43, because the printer controller 118 operates in an asynchronous manner relative to the printing request, the printer controller 118 responds to the port program 117 before executing the printing process.

In step S44, the port program 117 returns control to the spooler 116.

In step S45, the operations from the step S41 to S44 are executed for all the spooler jobs held in the spooler 116.

Therefore, in the present embodiment, based on each of the spooler jobs 10 and 20, two printer jobs are generated in the printer controller 118, that is, each of the spooler jobs 10 and 20 has two sub-printer jobs.

Because job IDs have not been assigned to the generated printer jobs at the present stage, the two sub-printer jobs of the spooler job 10 are temporarily referred to as "printer job A" and "printer job B", respectively, the two sub-printer jobs of the spooler job 20 are also temporarily referred to as "printer job A" and "printer job B", respectively.

In this way, processing on the spooler jobs by the spooler 116 is finished. Subsequently, the printer controller 118 processes the printer jobs.

Figure 7:
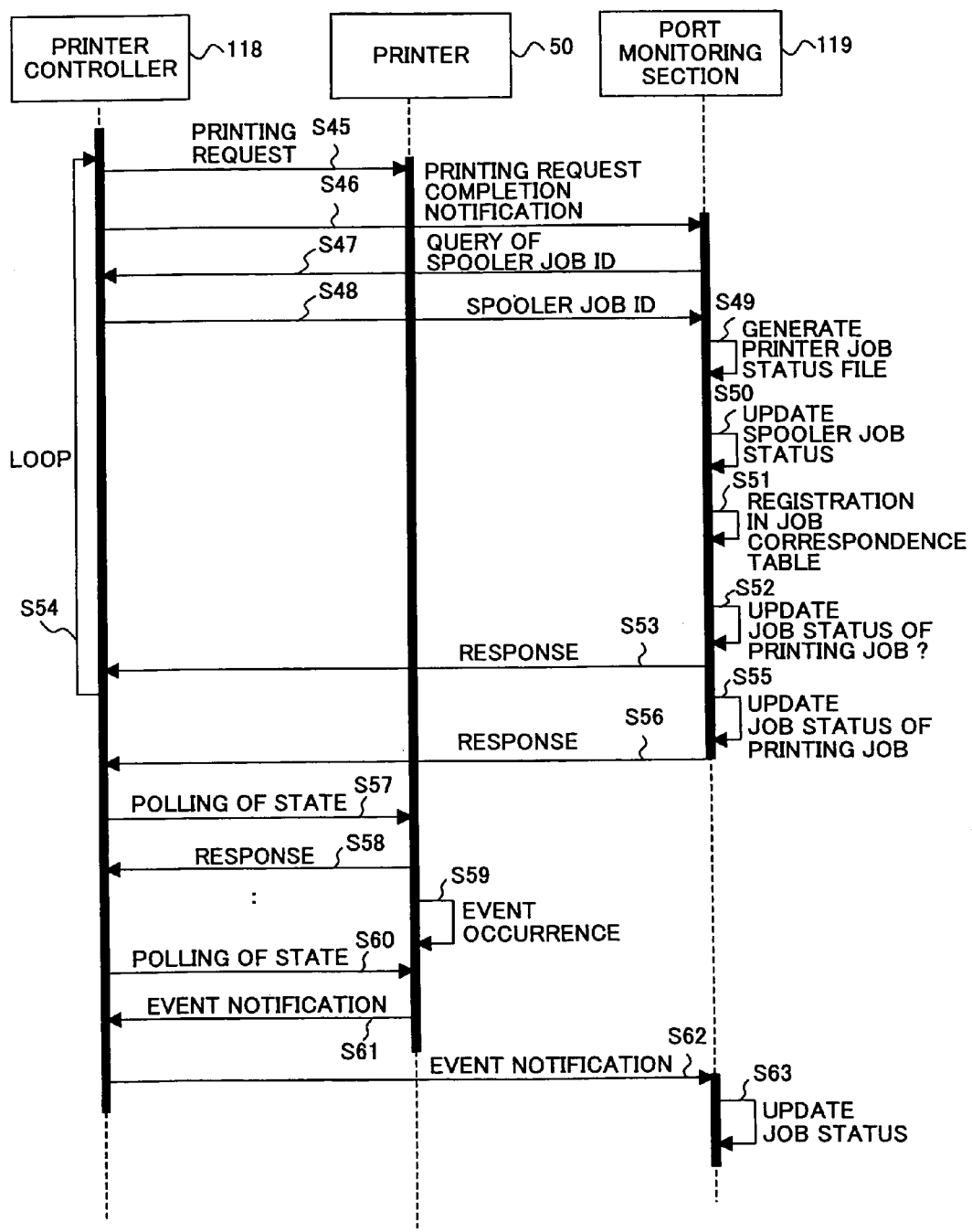
FIG. 7 is a sequence diagram, continued from the diagram in FIG. 6, showing the process of printing document data in the printing system 1.

FIG. 7 is a sequence diagram, continued from the diagram in FIG. 6, showing the process of printing document data in the printing system 1.

In step S45, the printer controller 118 transmits a printing request to the printer 50 for one of the printer jobs, for example, the printer job A. In other words, the printer controller 118 requests the printer 50 to print the printer data generated based on one document file. At this moment, a printer job ID is assigned to the printer job. For example, "ABC" is assigned to the printer job A as the job ID. Below, the printer job A is referred to as the printer job ABC.

In step S46, the printer controller 118 transmits the printer job ID of the printer job ABC to the port monitoring section 119, and at the moment, notifies the port monitoring section 119 of completion of the printing request for the printer job ABC.

In step S47, the port monitoring section 119 queries the printer controller 118 of the spooler job ID of the parent job of the printer job ABC by using the printer job ID of the printer job ABC as an argument.

In step S48, the port monitoring section 119 obtains the spooler job ID of the parent job of the printer job ABC.

In step S49, the port monitoring section 119 generates the printer job status file 134, which manages status information of the printer job ABC, and registers the status information of the printer job ABC with the generated printer job status file 134.

FIG. 21 is a view schematically showing an example of the printer job status information in the printer job status file 134. The items contained in the printer job status information are the same as those shown in FIG. 11.

As illustrated in FIG. 21, the printer job ID is ABC, and an initial value of the job status of the printer job ABC is registered to be "executing", indicating that the printer is processing the printer job ABC.

In step S50, the port monitoring section 119 carries out the same procedure as shown in FIG. 17 to update the status information in the spooler job status file 133 for the spooler job 10, which is the parent job of the printer job ABC.

FIG. 22 is a view schematically showing the spooler job status information, updated by printer job processing, in the spooler job status file 133.

As illustrated in FIG. 22, the initial value of the job status of the spooler job 10 is updated from "processing" to "executing". The number of sub-jobs is updated to be "1", and in the list of sub-jobs, the printer job ID (ABC) of the printer job ABC is registered.

In step S51, the port monitoring section 119 registers the printer job ID of the printer job ABC and the spooler job 10 with the job correspondence table 135.

Figure 23:
FIG. 23 is table schematically showing an example of the job correspondence table 135 registered with the printer job ID of the printer job ABC.

FIG. 23 is view schematically showing an example of the job correspondence table 135 registered with the printer job ID of the printer job ABC.

As illustrated in FIG. 23, in the job correspondence table 135, the printer job ID (ABC) is newly recorded in connection with the printing job ID and the spooler job ID. Because the printing job ID of the printing job 001 and the spooler job ID of the spooler job 10 have been registered in connection with each other, with the printer job ID being newly registered, the printer job ABC is managed in connection with the printing job 001 in the job correspondence table 135.

In step S52, the port monitoring section 119 confirms whether the status information of all of the spooler jobs belonging to the printing job 001 has been updated, and based on the confirmation results, the port monitoring section 119 determines if it is necessary to update the status information of the printing job 001.

When the status information of all of the spooler jobs has been updated, the status information of the printing job 001 also needs to be updated, otherwise, it is not necessary to update the status information of the printing job 001.

With reference to the job correspondence table 135, it is possible to determine whether the printing job, from which the printer job ABC is derived, is the printing job 001. In addition, all of the spooler jobs belonging to the printing job 001 can also be identified by referring to the job correspondence table 135.

In step S53, because the job status of the spooler job 20 has not been updated (still in "processing") yet, the port monitoring section 119 responds to the printing request completion notification from the printer controller 118 with the job status of the spooler job 20 not being updated.

In step S54, steps S45 through S52 are executed for all the printer jobs. Therefore, in the present embodiment, the same processing is performed also for the printer job B.

Specifically, a printer job ID is assigned to the printer job. For example, "CDE" is assigned to the printer job B as the job ID. Below, the printer job B is referred to as the printer job CDE. When operations up to step S51 are carried out for the printer jobs CDE, in step S52, the port monitoring section 119 confirms that the status information of all of the spooler jobs belonging to the printing job 001 is updated to "executing".

In step S55, the port monitoring section 119 updates the status information in the printing job status file of the printing job 001 from "processing" to "executing".

FIG. 24 is a view schematically showing the status information in the printing job status file, updated by printer job processing, in the spooler job status file 133.

As illustrated in FIG. 24, the value of the job status of the printing job 001 is updated to "executing".

In step S56, the printer controller 118 receives a response from the port monitoring section 119.

In step S57 and step 58, after receiving the response from the port monitoring section 119, the printer controller 118 polls the printer 50 of the state of the printing process therein.

Specifically, in step S57, the printer controller 118 queries the printer 50 of the state of the printing process therein. In step S58, the printer 50 makes a response indicating the state of the printing process. Steps S57 and S58 are repeated executed.

If any event occurs in the printer 50 (step S59), for example, printing completion, occurrence of anomaly, and so on, the printer controller 118 detects the event upon receiving a response from the printer 50 (steps S60 and S61).

In step S62, the printer controller 118 transmits the detected event to the port monitoring section 119 together with the printer job ID of the relevant printer job.

In step S63, the port monitoring section 119 updates the job status of all the jobs according to the type of the event. This operation is described below.

Figure 25:
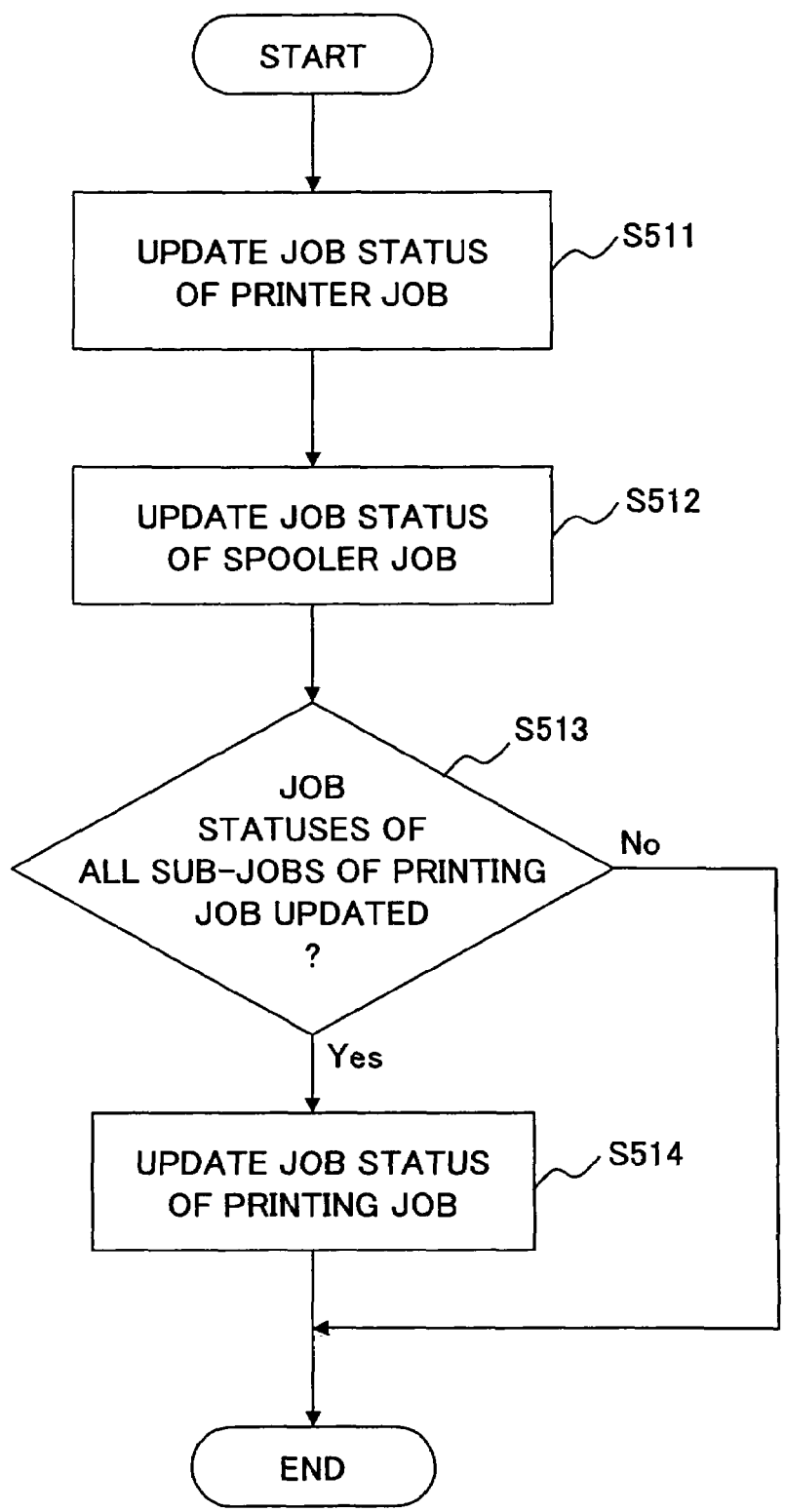
FIG. 25 is a flowchart for explaining the operation of updating the job status information in the port monitoring section 119 after receiving the notification from the printer controller 118.

FIG. 25 is a flowchart for explaining the operation of updating the job status information in the port monitoring section 119 after receiving the notification from the printer controller 118.

For example, the printer controller 118 notifies the port monitoring section 119 of completion of the printing operation of the printer job ABC.

In step S511, the port monitoring section 119 sets the value of the job status in the printer job status file 134 for the printer job ABC to be "completed", indicating completion of printing operation.

In step S512, the port monitoring section 119 sets the value of the job status in the spooler job status file 133 for the spooler job 10, which is the parent job of the printer job ABC, to be "completed".

In step S513, the port monitoring section 119 determines whether the job statuses of all the sub-jobs (spooler jobs) of the printing job 001, which the printer job ABC belongs to, have been updated, that is, whether values of the job statuses of the spooler jobs are "completed".

If the job statuses of all the spooler jobs have been updated, the procedure proceeds to step S514.

If the job status of any spooler job has not been updated, the present updating procedure is finished.

In step S514, the value of the job status of the printing job 001 in the printing job status file 132 is updated to "completed".

If the port monitoring section 119 determines the job status of any spooler job has not been updated in step S513, the job status of the printing job 001 is updated to "completed" after the printer controller 118 notifies the port monitoring section 119 of completion of the printing operation of the printer job CDE subsequent to the printer job ABC.

The operations shown in FIG. 25 are carried out each time the notification from the printer controller 118 is received, and thereby, the job statuses of the jobs are updated at once.

In this way, the printing process, which is executed in response to the printing request from the Web browser 41 on the terminal 40, is completed. As mentioned above, in the printing server 10, jobs are generated at different stages of the printing process, and the job statuses of the jobs changes. The relation between stages of the printing process and the values of the job statuses of the jobs is summarized below.

Figure 26:
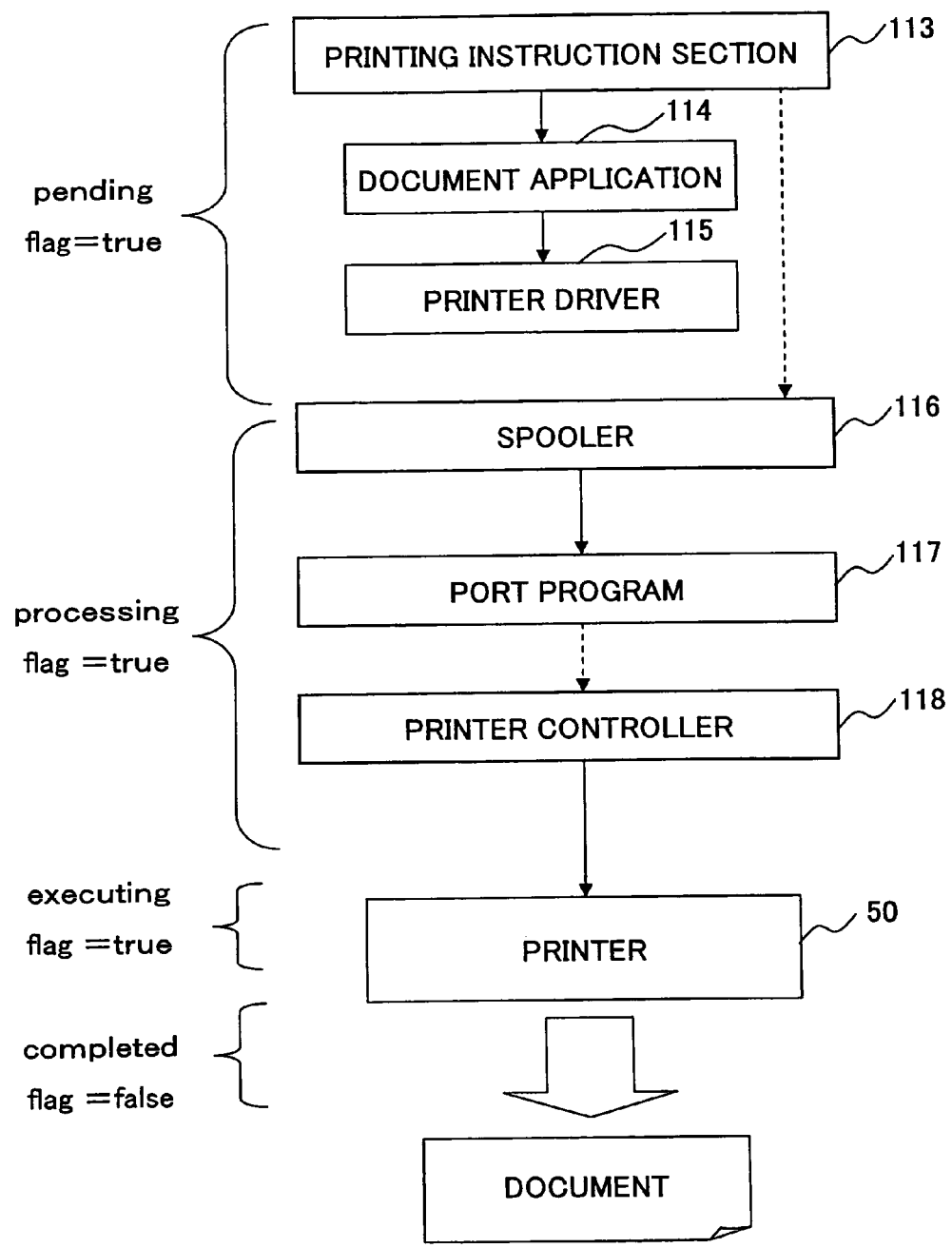
FIG. 26 is a block diagram schematically showing the relation between the stage of a printing process and the value of a job status.

FIG. 26 is a block diagram schematically showing the relation between the stage of a printing process and the value of a job status.

As illustrated in FIG. 26, the "pending" status is related to the stage from the time when the printing instruction section 113 receives the printing request to the time when the printing request is sent to the spooler 116.

The "processing" status is related to the stage from the time when the spooler 116 receives the printing request to the time when the printer controller 118 sends the printing request to the printer 50.

The "executing" status is related to the stage from the time when the printer controller 118 sends the printing request to the printer 50 to the time when events (for example, printing or others) occur in the printer 50.

The "completed" status is related to the stage after the printer 50 executed the printing operation.

In addition, in FIG. 26, a flag is illustrated below the respective job status, indicating whether job operation is allowed when the job status is "pending", "processing", "executing", or "completed". In FIG. 26, according to the given value of the flag, job operation is allowed when the job status is "pending", "processing", or "executing", and is not allowed when the job status is "completed".

Below, an explanation is given to the operation of providing the job status information in the printing server 10 to the Web server 30, or to the terminal 40 through the Web server 30.

Figure 27:
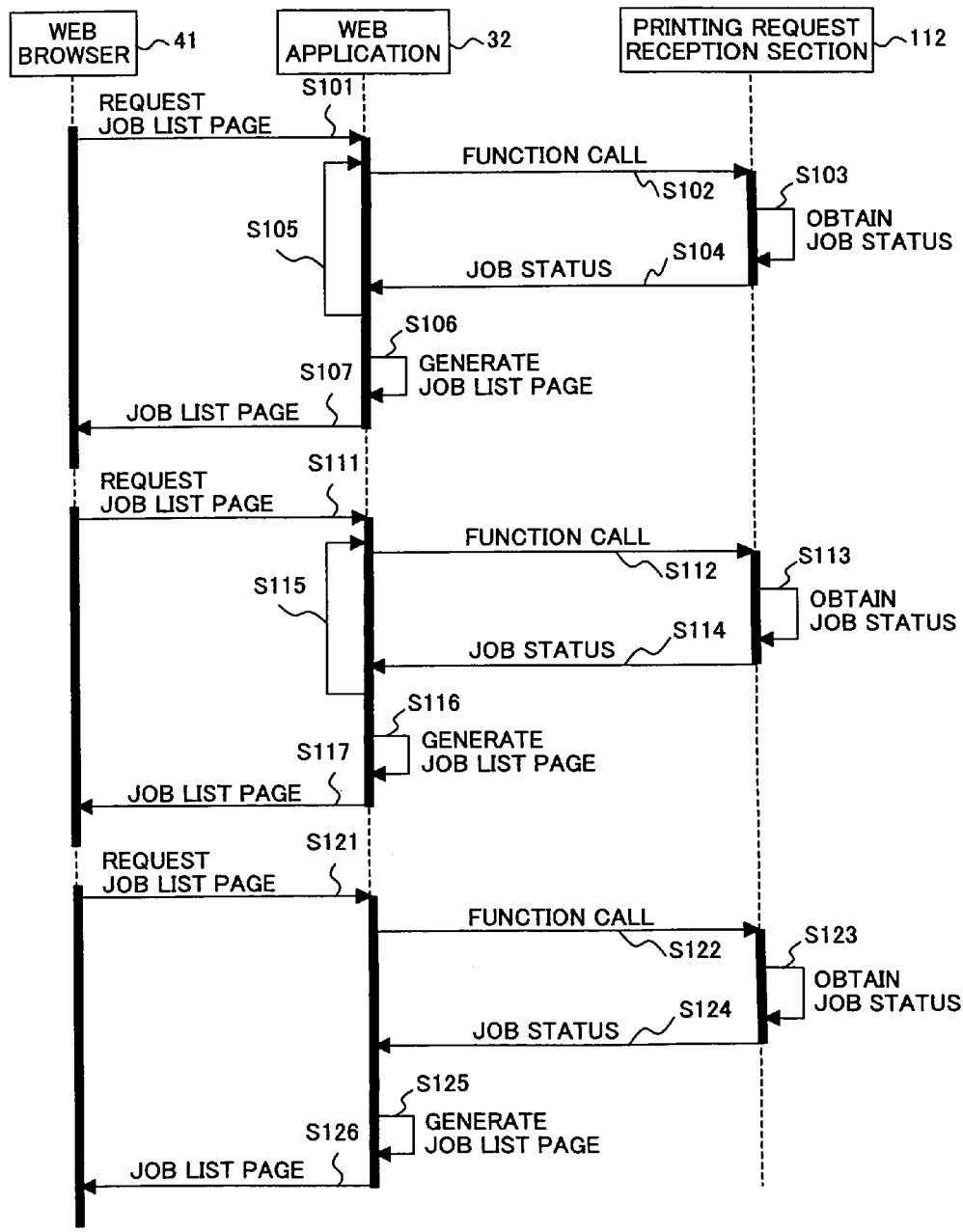
FIG. 27 is a sequence diagram showing the operation of the printing server 10 to provide the job status information.

FIG. 27 is a sequence diagram showing the operation of the printing server 10 to provide the job status information.

In step S101, after a user inputs a URL, into the Web browser 41, of a Web page showing a list of the job status information, the Web browser 41 requests the Web server 30 to transmit the Web page of the list of the job status information (below, "the Web page of the list of the job status information" is abbreviated to be "job list page").

In step S102, the Web application 32 calls out a job status acquisition function of the printing request reception section 112 of the printing server 10 by the RPC in SOAP, and then the Web application 32 transmits a request to the printer server 10 to obtain printing job status information created based on previously printing requests by the user of the terminal 40.

FIG. 28 is view for schematically showing an interface of the job status acquisition function of the printing request reception section 112.

Shown in FIG. 28 are the main arguments of the job status acquisition function, and types of the arguments (input or output). These arguments include a parent job ID, a job ID, and status information. An input argument is used when calling the job status acquisition function, and an output argument is used as a returning value output by the job status acquisition function.

In FIG. 28, the parent job ID and the job ID are input arguments, and the status information is an output argument of the job status acquisition function.

The parent job ID may be specified to be the printing job ID of a printing job, from which the object job is derived. Here, the object job is the job whose status information is to be acquired.

The job ID may be specified to be the job ID of a spooler job or a printer, whose status information is to be acquired. If the object job is a printing job, it is not necessary to specify the job ID, because the job ID of the printing job is already specified as the parent job ID.

The status information takes the value of the item of the status information contained in the status information file of the object job, for example, that shown in FIG. 11. Here, it is assumed that the status information includes the list of sub-job IDs. From the list of sub-job IDs, the status information of the object job is made in connection with the status information of the sub-jobs of the object job.

Therefore, in step S102, the Web application 32 of the Web server 30 calls out the job status acquisition function of the printing request reception section 112 with the input arguments being set as follows.

Parent job ID: assigned to be the printing job ID (as shown in FIG. 4, step S18) stored in the Web application 32, which is the value returned when calling out the printing function (as shown in FIG. 4, step S12) in response to the printing request from the current user. If the current user made a number of printing requests previously, the parent job ID is assigned to be one of the printing job IDs.

Job ID: assigned to be NULL.

When the Web application 32 calls out the job status acquisition function by RPC in SOAP, the Web application 32 transmits a SOAP message to the printing request reception section 112.

FIG. 29 shows an example of the SOAP message transmitted to the printing request reception section 112 when the Web application 32 calls out the job status acquisition function.

In the SOAP message 710 in FIG. 29, the tag name variable of the tag 711 "getJobList" is assigned to be the function name of the job status acquisition function. The descriptions 712, 713, and 714 present information of arguments.

The description 712 in the tag <parentJobID> corresponds to the argument "parent job ID", and its value is set to be "001". The description 713 in the tag <JobID> corresponds to the argument "job ID", and its value is not assigned.

In step S103, after the Web application 32 calls out the job status acquisition function, the printing request reception section 112 executes the programs related to the job status acquisition function.

Figure 30:
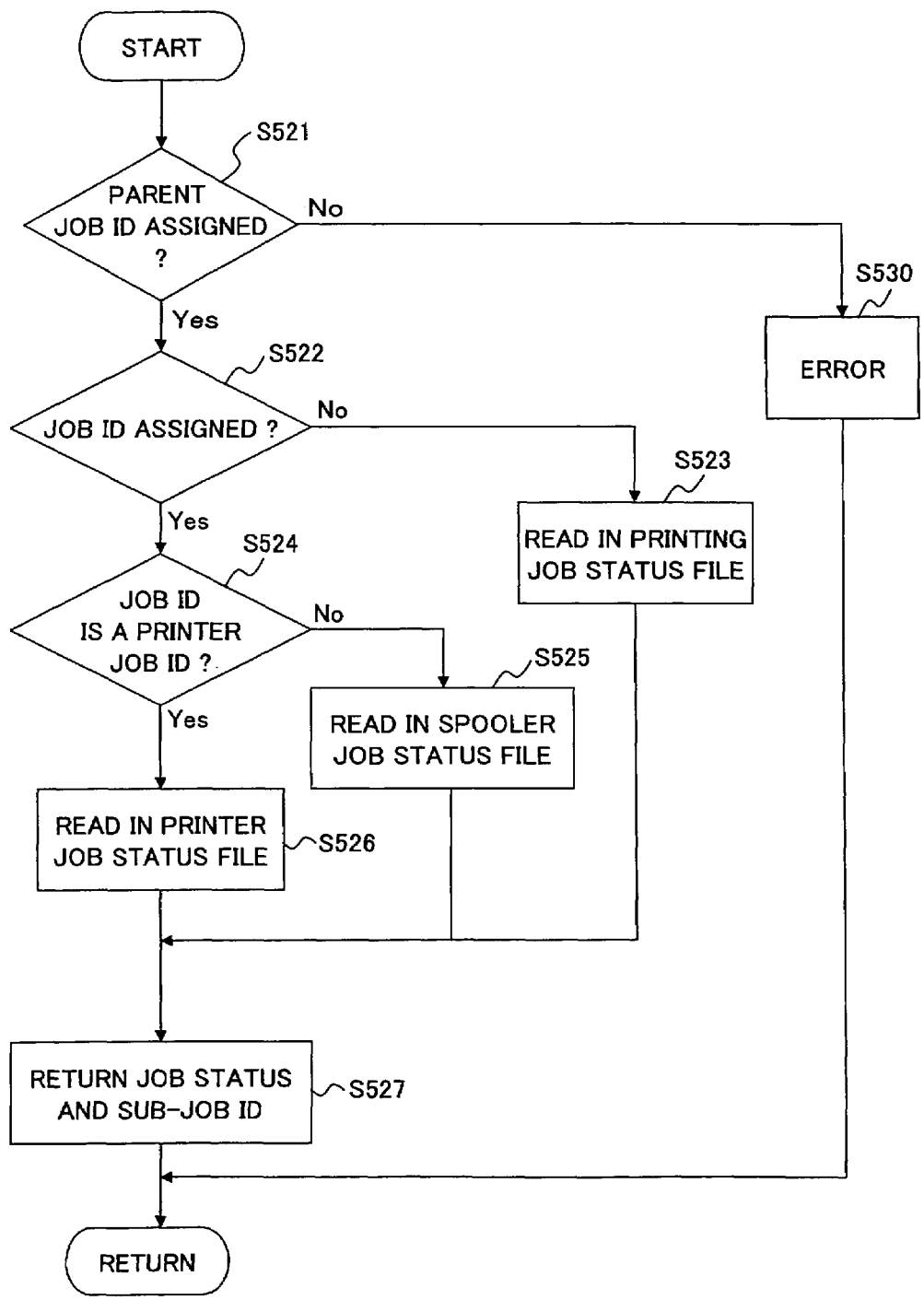
FIG. 30 is a flow chart showing operations of the job status a acquisition function.

FIG. 30 is a flowchart showing operations of the job status acquisition function.

In step S521, the printing request reception section 112 determines whether the value of the argument "parent job ID" is assigned.

If the value of the argument "parent job ID" is not assigned, an error message is returned (step S530).

If the argument "parent job ID" is assigned to be a certain value, in step S522, the printing request reception section 112 further determines whether the value of the argument "job ID" is assigned.

If the value of the argument "job ID" is not assigned, in step S523, the printing request reception section 112 reads in the printing job status file 132 of a printing job determined by the value of the argument "parent job ID" to obtain the job status information.

If the value of the argument "job ID" is assigned, in step S524, the printing request reception section 112 further determines whether the job ID is a printer job ID. For example, the printing request reception section 112 may determine whether the job ID conforms to the numbering scheme of printer job IDs, so as to determine whether the job ID is a printer job ID.

If it is determined that the job ID is not a printer job ID but a spooler job ID, in step S525, the printing request reception section 112 reads in the spooler job status file 133 of a spooler job determined by the value of the argument "job ID" to obtain the job status information.

If it is determined that the job ID is a printer job ID, in step S526, the printing request reception section 112 reads in the printer job status file 134 of a printer job determined by the value of the argument "job ID" to obtain the job status information.

In step S527, the obtained job status information is assigned to the output argument, and is returned.

Therefore, in step S103 in FIG. 27, the job status information of the printing job is assigned to the output argument.

In step S104 in FIG. 27, the printing request reception section 112 transmits a SOAP message including the returning information of the job status acquisition function (job status information), that is, the output argument, to the Web application 32.

FIG. 31 shows an example of the SOAP message including the returning information of the job status acquisition function.

In the SOAP message 720 in FIG. 31, the portion indicated by the sign 721 is the job status information. Specifically, the description 722 in the tag <jobStatus> is set to be "executing". The description 723 in the tag <entryTime> gives the job entry time. The description 724 in the tag <numOfSubJob> indicates that the number of the sub-jobs is 2. The description 725 in the tag <SubJobIds> gives the list of the sub-job IDs, including 10 and 20. In the description 726, the flag is set to be "true", and in the description 727, the job name is set to be "document 1".

Returning to FIG. 27, in step S105, operations in step S102 through S104 are repeatedly executed by a number of times equaling the number of the printing job IDs corresponding to the current user and stored by the Web application 32. As a result, the Web application 32 collected the status information of all the printing jobs corresponding to the current user.

In step S106, based on the obtained status information, the Web application 32 generates a Web page to display the job list page.

In step S107, the Web application 32 transmits the job list page to the Web browser 41. The Web browser 41 displays the job list page, and whereby the user is allowed to confirm the states of the printing jobs related to the printing requests made previously.

FIG. 32 is a view schematically showing an example of the job list page.

As illustrated in FIG. 32, the job list page 430 presents job name, job status, and entry time. In FIG. 32, a printing job having a job name of "document 1" (below, referred to as "document 1 job") is shown, and the job status thereof is "executing". In the printing server 10, the job status of the printing job is updated only after the job statuses of the spooler jobs belonging to the printing job are all updated. Further, one spooler job corresponds to one document file.

Therefore, as the document 1 job is shown to be "executing", it indicates that at least printing requests have been made to the printer 50 for all the document files included in the document 1 (see FIG. 26).

As for the document 2, as the document 2 job is shown to be "processing", it indicates that at least printing requests have been made to the spooler 116 for all the document files included in the document 2.

In addition, as for the document 3, since the document 3 job is shown to be "pending", it indicates that the printing process has not been transited to the spooler 116 for all the document files included in the document 3.

In FIG. 32, there is a mark ">>" in front of the job name "document 1" (and "document 2"). This mark indicates that the document 1 job (and the document 2 job) has sub-jobs. In addition, the job name "document 1" (and "document 2") is underlined. This indicates that a link 431 to the status information of the sub-jobs is established. That is, when the Web application 32 creates the job list page 430, by referring to the "number of sub-jobs" in the obtained status information, the Web application 32 determines whether sub-jobs exist, and adds the mark ">>" or establish the link 431 based on the result.

In FIG. 32, a cancel button 431 and a pause button 432 are presented in the job list page 430. These buttons are for operating the jobs shown in the job list page 430.

Returning to FIG. 27, in step S111, in order to refer to the job status of the spooler job belonging to the document 1 job, the user of the terminal 40 clicks the link 431, and the Web browser 41 requests the Web application 32 of the Web server 30 to transmit the job list page, which displays the job status of the spooler job belonging to the document 1 job.

In step S112, the Web application 32 calls out the job status acquisition function of the printing request reception section 112 of the printing server 10 by the RPC in SOAP, and then the Web application 32 requests the printing request reception section 112 to transmit job status information of one of the spooler jobs belonging to the document 1 job. In this operation, the arguments of the job status acquisition function of the printing request reception section 112 are set as follows.

Parent job ID: assigned to be the printing job ID of the document 1 job.

Job ID: assigned to be one of the sub-job IDs in the sub-job ID list included in the status information received as an output argument.

When the Web application 32 calls out the job status acquisition function in step S112, the Web application 32 transmits a SOAP message to the printing request reception section 112.

FIG. 33 shows an example of the SOAP message transmitted to the printing request reception section 112 when the Web application 32 calls out the job status acquisition function.

In the SOAP message 730 in FIG. 33, the description 731 in the tag <parentJobID> is set to be the printing job ID "001". The description 732 in the tag <JobID> is set to be "10", which is one of the sub-job IDs in the sub-job ID list in the status information received in step S104.

In step S113, the printing request reception section 112 performs the operations shown in FIG. 30, and transmits to the Web application 32 a SOAP message including the returning information of the job status acquisition function, that is, the status information of the spooler job determined by the parent job ID and job ID assigned to the arguments.

FIG. 34 shows an example of the SOAP message including the returning information of the job status acquisition function.

In the SOAP message 740 in FIG. 34, the description 741 in the tag <jobStatus> is set to be "completed". The description 742 in the tag <numOfSubJob> indicates that the number of the sub-jobs is 1. The description 743 in the tag <SubJobIds> indicates that the sub-job ID is "ABC". In the description 744, the flag is set to be "false". In the description 745, the job name is set to be "file A".

Rerunning to FIG. 27, in step S115, operations in steps S112 through S114 are repeatedly executed by a number of times equaling the number of the spooler jobs. As a result, the Web server 30 collected the status information of all the spooler jobs belonging to the document 1.

In step S116, based on the obtained status information, the Web application 32 generates the job list page.

In step S117, the Web application 32 transmits the job list page to the Web browser 41. The Web browser 41 displays the job list page.

FIG. 35 is a view schematically showing an example of the job list page displaying job status information of spooler jobs.

As illustrated in FIG. 35, in the region 441 of the job list page 440, the spooler jobs belonging to the document 1 job are arranged in connection with the document 1 job in a hierarchical structure so as to allow the user to confirm the parent-child relation with the document 1 job. According to the region 441, the spooler jobs belonging to the document 1 job include file A job and file B job. The status of the file A job is "normally finished", and the status of the file B job is "executing".

Returning to FIG. 27, in step S121, the user of the terminal 40 clicks the link 443 in the job list page 440, and the Web browser 41 requests the Web application 32 of the Web server 30 to transmit the job list page for displaying the job status of the printer job belonging to the file B job.

In step S122, the Web application 32 calls out the job status acquisition function of the printing request reception section 112 of the printing server 10 by the RPC in SOAP, and then the Web application 32 requests the printing request reception section 112 to transmit job status information of the printer job belonging to the file B job.

In this operation, the arguments of the job status acquisition function of the printing request reception section 112 are set as follows.

Parent job ID: assigned to be the printing job ID of the document 1 job.

Job ID: assigned to be the sub-job ID in the status information received as an output argument.

In step S123, the printing request reception section 112 performs the operations shown in FIG. 30, and transmits to the Web application 32 the status information of the printer job determined by the parent job ID and job ID assigned to the arguments as the returning information of the job status acquisition function.

Here, because one spooler job corresponds to one printer job, it is not necessary to repeat the operations in steps S122 through S124.

In step S125, based on the obtained status information, the Web application 32 generates the job list page.

In step S126, the Web application 32 transmits the job list page to the Web browser 41, and the Web browser 41 displays the job list page.

FIG. 36 is a view schematically showing an example of the job list page displaying job status information of printer jobs.

As illustrated in FIG. 36, in the region 451 of the job list page 450, a printer job belonging to the file B job is displayed.

According to the printing server 10 of the present embodiment, it is possible to provide status information of printing jobs, spooler jobs, and printer jobs to the Web server 30 or other clients, thereby, on the side of the clients, it is possible to confirm the state of jobs.

Especially, by providing the states of the printing jobs corresponding to a user's printing request, the user can easily confirm the overall state of the printing process corresponding to his printing request, without confirming processing states of the document files one by one.

In addition, because the sub-job ID list of sub-jobs belonging to a printing job is included in the status information, the user can confirm the parent-child relation of the jobs on the client side. Thereby, in each client, it is possible to construct a user interface to hierarchically display the parent-child relation of the jobs in a tree form, just like the job list page of the present embodiment. Of course, presentation of the status information in the job list page is not limited to the tree form, as long as the parent-child relation of the jobs can be clearly expressed, any other form, for example, a table form, may also be adopted.

Below, an explanation is given to operations of canceling jobs upon instructions from a user.

Figure 37:
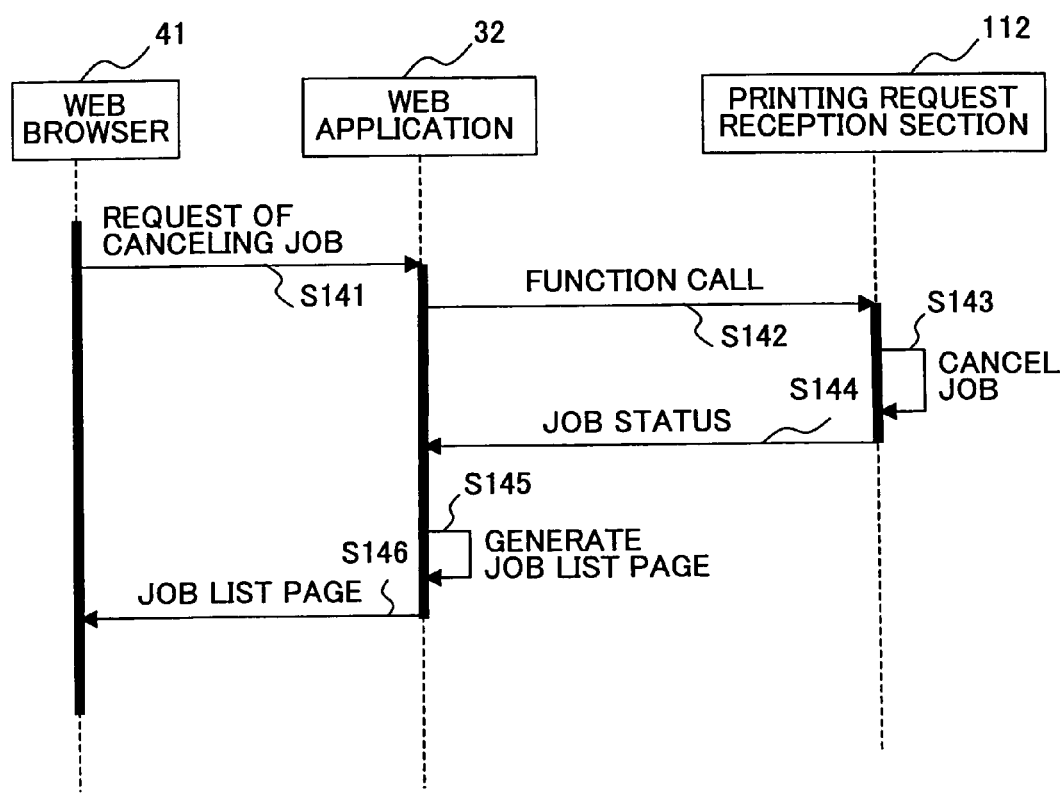
FIG. 37 is a sequence diagram showing a process of canceling jobs in the printing system 1.

FIG. 37 is a sequence diagram showing a process of canceling jobs in the printing system 1.

In steps S141 and S142, the user checks a check box 453 in the job list page 450 shown in FIG. 36, thereby selecting the document 1 job, which is a printing job, as the job to be deleted. Then, the user clicks the cancel button 452 to transmit a cancellation request to the printing request reception section 112 via the Web application 32.

The Web application 32 makes the job cancellation request by calling out the cancellation function of the printing request reception section 112 by the RPC in SOAP.

In step S143, the printing request reception section 112 executes programs related to the cancellation function.

Figure 38:
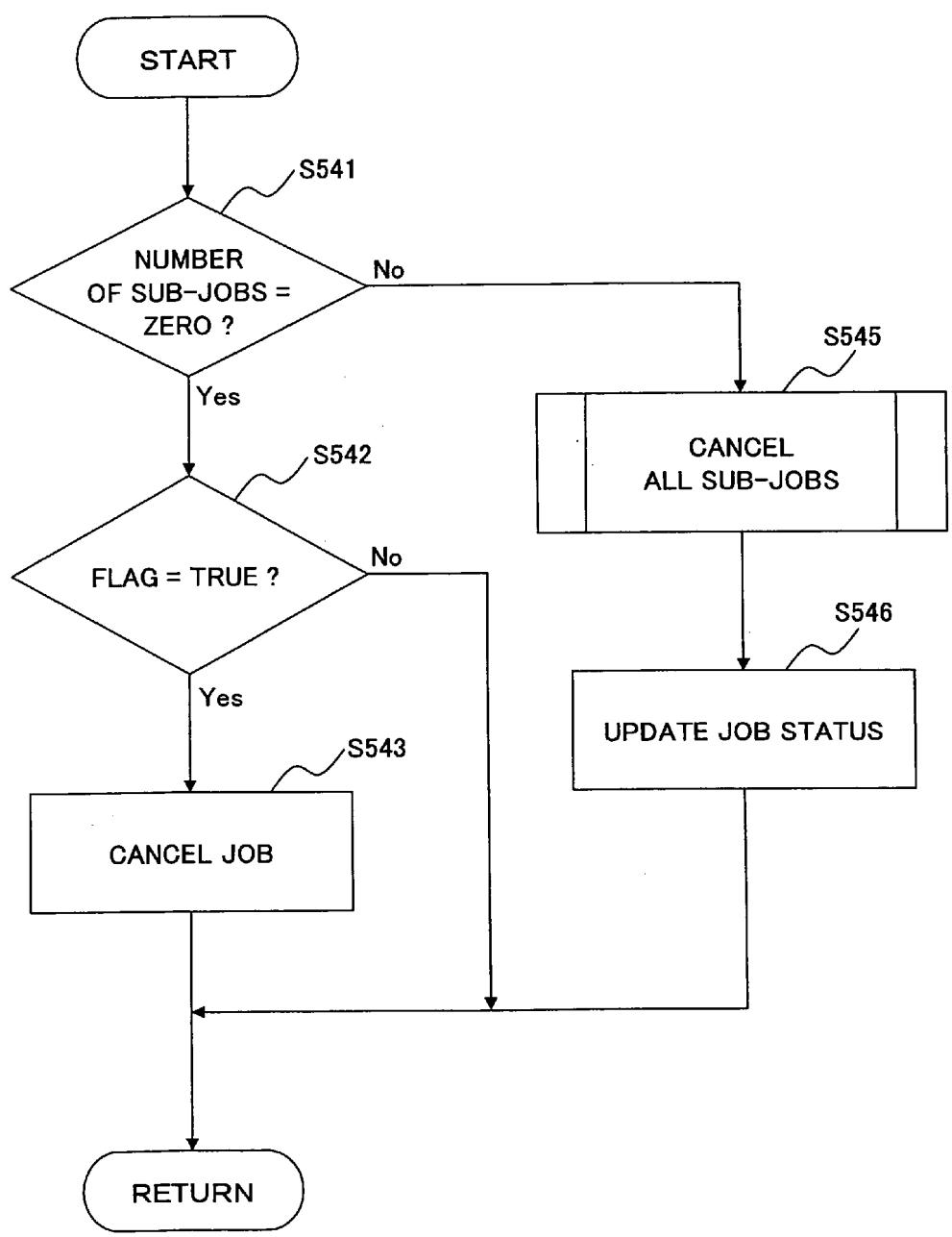
FIG. 38 is a flowchart for explaining the operation of job cancellation in the printing request reception section 112.

FIG. 38 is a flowchart for explaining the operation of job cancellation in the printing request reception section 112.

In step S541, making reference to "number of sub-jobs" in the job status file of the job selected to be deleted (below, referred to as "object job"), the printing request reception section 112 determines whether the object job has sub-jobs.

If it is determined that a sub-job does not exit, that is, the printing process is not ahead of the object job, the routine proceeds to step S542, in this case, the printing request reception section 112 just needs notify the execution units of the object job that this job is to be canceled. The execution units of the object job may include the printing instruction section 113 when the object job is a printing job, the spooler 116 when the object job is a spooler job, or the printer controller 118 when the object job is a printer job.

If it is determined that sub-jobs exit, that is, the printing process proceeds ahead of the object job, the printing request reception section 112 needs to notify, instead of the execution units of the object job, the execution units of the sub-jobs that the object job is to be canceled.

In step S542, referring to flag registered in the job status file of the object job, the printing request reception section 112 determines whether it is allowed to operate the object job.

If it is determined that the flag is "false", that is, the object job has proceeded to a stage that cannot be operated, it is impossible to delete the job. In this case, the printing request reception section 112 stops executing of the cancellation function and returns.

If it is determined that the flag is "true", that is, it is possible to delete the object job. In this case, the routine proceeds to step S543.

In step S543, the cancellation operation is different for different type of the object job.

If the object job is a printing job, the printing request reception section 112 sets the status information in the printing job status file 132 of the object job to be "canceled", and thereby, the object job is canceled. The printing instruction section 113 does not process a printing job whose status information is "canceled".

If the object job is a spooler job or a printer job, the printing request reception section 112 instructs the spooler 116 or the printer controller 118 to cancel jobs (API calling). Further, the printing request reception section 112 sets the status information of the object job to be "canceled", and thereby, the object job is canceled.

If in step S541 it is determined that the object job has sub-jobs, the routine proceeds to step S545.

In step S545, the printing request reception section 112 carries out operations in steps S541 through S543 for all the sub-jobs of the object job, and the step S543 (job cancellation) is recursively executed for those jobs having no sub-job and having a status of "true".

In step S546, the printing request reception section 112 updates the job status of the object job to be that of the latest un-cancelled sub-job and finish the cancellation operation. If all of the sub-jobs are cancelled, the job status of the object job is updated to "canceled".

For example, if the object job is the document 1 job (FIG. 36), the document 1 job has two sub spooler jobs, that is, the file A job and the file B job. The step S545, including operations from steps S541 to S543, is recursively executed for the file A job and the file B job.

For example, the job status of the file A job is "completed", indicating that the file A job is normally completed. Accordingly, in the job status file, the flag is "false", indicating that the file A job is not operable, that is, the file A job cannot be canceled.

On the other hand, in step S541, it is determined that the file B job has sub printer jobs (referred to as "file B printer job" below). Hence, the step S545 is recursively executed for the file B printer job. Consequently, the step S543 (job cancellation) is executed for the file B printer job, ad the job status of the file B job, which is a spooler job, is set to be "canceled".

Further, after the step S545 is executed for all the sub-jobs of the document 1 job, the job status of the document 1 job is set to be "completed", the value of the job status of the un-canceled job, that is, the file A document.

Returning to FIG. 37, in step S144, in response to calling of the cancellation function, the printing request reception section 112 executes job cancellation, and transmits to the Web application 32 a list of the status information of the sub-jobs of the object job.

In step S145, the Web application 32 generates the job list page with the canceled jobs to be un-displayed.

In step S146, the Web application 32 transmits the job list page to the Web browser 41, and the Web browser 41 displays the job list page.

FIG. 39 is a view schematically showing an example of the job list page after cancellation operation on the document 1 job.

Comparing with the job list page 450 in FIG. 36, in the job list page 460 in FIG. 39, the file B job, which is a spooler job and is a sub-job of the document 1 job, is not displayed. In addition, the file B printer job, which is a printer job and is a sub-job of the file B job, is not displayed, either.

Further, the job status of the document 1 job is "completed", the same as that of the file A job.

In the above, the printing job is selected as the object job to be canceled in the job list page 450. Certainly, a spooler job or a printer job can also be selected and canceled. In addition, operations on jobs are not limited to job cancellation, pause or various other functions can also be realized.

According to the printing system 1 of the present embodiment, a user is capable of operating jobs at different stages of a printing process. Especially, because it is possible to operate jobs in units of a printing job corresponding to a printing request, the user can cancel all the spooler jobs related to his printing request, without operating the spooler jobs one by one.

According to the present invention, it is possible to provide a printing processing device in which different jobs are generated at different stages of the printing process, being capable of providing information of a job generated at one stage of a printing process in connection with information of a job generated at another stage of the printing process.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2003-204822 filed on Jul. 31, 2003, and Japanese Priority Patent Application No. 2004-188075 filed on Jun. 25, 2004, the entire contents of which are hereby incorporated by reference.

What is claimed is:

1. A printing processing device configured to control a printing job according to a stage of a printing process and configured to provide a client device with information of the printing job, said printing job being generated corresponding to a printing request from the client device connected to the printing processing device via a network, said printing processing device comprising:
a job information providing unit configured to provide the client device, in response to an information providing request from the client device for providing information of the printing job, with first job state identification information and second job state identification information in connection with the first job state identification information, said first job state identification information being used for identifying a state of a first-stage job generated at a first stage of the printing process, said second job state identification information being used for identifying a state of a second-stage job generated at a second stage of the printing process, said second-stage job being generated from the first-stage job and having a job granularity different from the job granularity of the first-stage job;
a first job unit configured to execute the first-stage job; and
a second job unit, different from the first job unit, configured to execute the second-stage job.

2. The printing processing device as claimed in claim 1, wherein a plurality of said second-stage jobs is generated from the first-stage job.

3. The printing processing device as claimed in claim 1, wherein the job information providing unit provides the first job state identification information and the second job state identification information in response to calling of a predetermined function.

4. The printing processing device as claimed in claim 1, wherein
the information providing request includes a first job identifier for identifying the first-stage job; and
the job information providing unit is further configured to provide the client device with the first job state identification information and a second job identifier for identifying the second-stage job generated from the first-stage, said first job state identification information corresponding to the first job identifier.

5. The printing processing device as claimed in claim 4, wherein the job information providing unit is further configured to provide the client device with information of a number of the second-stage jobs.

6. The printing processing device as claimed in claim 1, further comprising:
a management unit configured to manage the first job state identification information of each of a plurality of the first-stage jobs;
an updating unit configured to update a value of the first job state identification information in the management unit when the state of the first-stage job changes,
wherein the job information providing unit is further configured to provide the client device with the first job state identification information obtained from the management unit.

7. The printing processing device as claimed in claim 6, wherein the updating unit is further configured to update the value of the first job state identification information in the management unit when the second-stage job is generated from the first-stage job.

8. The printing processing device as claimed in claim 6, wherein the updating unit is further configured to update the value of the first job state identification information in the management unit when states of a plurality of the second-stage jobs generated from the first-stage job change.

9. The printing processing device as claimed in claim 1, further comprising:
a job correspondence management unit configured to manage correspondence information of the first-stage job and the second-stage job.

10. The printing processing device as claimed in claim 1, further comprising:
a job operating unit configured to, in response to an operation execution request from the client device for executing a predetermined operation on the first-stage job, execute the predetermined operation on the first-stage job.

11. The printing processing device as claimed in claim 10, wherein the job operating unit is further configured to execute the predetermined operation on the first-stage job when it is allowed to execute operations on said first-stage job based on the state of said first-stage job.

12. The printing processing device as claimed in claim 10, wherein the predetermined operation includes canceling the first-stage job.

13. The printing processing device as claimed in claim 1, wherein
the first-stage job is generated corresponding to a printing request of printing more than one document file; and
the second-stage job is generated corresponding to each of the document files.

14. The printing processing device as claimed in claim 13, wherein
the first-stage job is generated in a process of converting the document files into printing data able to be processed by an image processing device; and
the second-stage job is processed in a spooler for storing the printing data.

15. A printing processing device configured to control a printing job according to a stage of a printing process and configured to provide a client device with information of the printing job, said printing lob being generated corresponding to a printing request from the client device connected to the printing processing device via a network, said printing processing device comprising:
a job information providing unit configured to provide the client device, in response to an information providing request from the client device for providing information of the printing job, with first job state identification information and second job state identification information in connection with the first job state identification information, said first job state identification information being used for identifying a state of a first-stage job generated at a first stage of the printing process, said second job state identification information being used for identifying a state of a second-stage job generated at a second stage of the printing process, said second-stage job being generated from the first-stage job and having a job granularity different from the job granularity of the first-stage job,
wherein
the information providing request includes a first job identifier for identifying the first-stage job,
the job information providing unit is further configured to provide the client device with the first job state identification information and a second job identifier for identifying the second-stage job generated from the first-stage, said first job state identification information corresponding to the first job identifier, and
at least the first job identifier is used as input information of a predetermined function, and at least the first job state identification information and the second job identifier are used as output information of the predetermined function.

16. The printing processing device as claimed in claim 15, wherein the output information of the predetermined function further includes the information of the number of the second-stage jobs.

17. A printing processing device configured to control a printing job according to a stage of a printing process and configured to provide a client device with information of the printing job, said printing job being generated corresponding to a printing request from the client device connected to the printing processing device via a network, said printing processing device comprising:
a job information providing unit configured to provide the client device, in response to an information providing request from the client device for providing information of the printing job, with first job state identification information and second job state identification information in connection with the first job state identification information, said first job state identification information being used for identifying a state of a first-stage job generated at a first stage of the printing process, said second job state identification information being used for identifying a state of a second-stage job generated at a second stage of the printing process, said second-stage job being generated from the first-stage job and having a job granularity different from the job granularity of the first-stage job,
wherein
the first-stage job is generated corresponding to a printing request of printing more than one document file
the second-stage job is generated corresponding to each of the document files,
the first-stage job is generated in a process of converting the document files into printing data able to be processed by an image processing device,
the second-stage job is processed in a spooler for storing the printing data,
a third-stage job generated at a third stage of the printing process is generated from the second-stage job, and
the third-stage job is generated for the image processing device to print the printing data.

18. The printing processing device as claimed in claim 17, further comprising:
a querying unit configured to query about a state of a process of printing the printing data in the image processing device,
wherein a state of the third-stage job is changed based on a query result of the querying unit.

19. An image processing device for executing a printing process in response to a request from a printing processing device, wherein
the printing processing device is configured to control a printing job according to a stage of the printing process and configured to provide a client device with information of the printing job, said printing job being generated corresponding to a printing request from the client device connected to the printing processing device via a network, said printing processing device comprising:
a job information providing unit configured to provide the client device, in response to an information providing request from the client device for providing information of the printing job, with first job state identification information and second job state identification information in connection with the first job state identification information, said first job state identification information being used for identifying a state of a first-stage job generated at a first stage of the printing process, said second job state identification information being used for identifying a state of a second-stage job generated at a second stage of the printing process, said second-stage job being generated from the first-stage job and having a job granularity different from the job granularity of the first-stage job;
a first job unit configured to execute the first-stage job; and
a second job unit, different from the first job unit, configured to execute the second-stage job.

20. The image processing device as claimed in claim 19, wherein
the first-stage job is generated corresponding to a printing request of printing more than one document file; and
the second-stage job is generated corresponding to each of the document files.

21. The image processing device as claimed in claim 20, wherein
the first-stage job is generated in a process of converting the document files into printing data able to be processed by the image processing device; and
the second-stage job is processed in a spooler for storing the printing data.

22. An image processing device for executing a printing process in response to a request from a printing processing device, wherein
the printing processing device is configured to control a printing job according to a stage of the printing process and configured to provide a client device with information of the printing job, said printing job being generated corresponding to a printing request from the client device connected to the printing processing device via a network, said printing processing device comprising:
a job information providing unit configured to provide the client device, in response to an information providing request from the client device for providing information of the printing job, with first job state identification information and second job state identification information in connection with the first job state identification information, said first job state identification information being used for identifying a state of a first-stage job generated at a first stage of the printing process, said second job state identification information being used for identifying a state of a second-stage job generated at a second stage of the printing process, said second-stage job being generated from the first-stage job and having a job granularity different from the job granularity of the first-stage job,
wherein
the first-stage job is generated corresponding to a printing request of printing more than one document file,
the second-stage job is generated corresponding to each of the document files,
the first-stage job is generated in a process of converting the document files into printing data able to be processed by the image processing device,
the second-stage job is processed in a spooler for storing the printing data,
a third-stage job generated at a third stage of the printing process is generated from the second-stage job, and
the third-stage job is generated for the image processing device to print the printing data.

23. The image processing device as claimed in claim 22, wherein
the printing processing device further comprises a querying unit configured to query about a state of a process of printing the printing data in the image processing device; and
the image processing device is configured to transmit information of the state of the process of printing the printing data.

24. A document management device configured to manage a plurality of document files and transmits predetermined document files to a printing processing device in response to a request from the printing processing device, said printing processing device configured to instruct an image processing device to print the predetermined document files,
wherein
the printing processing device is configured to control a printing job according to a stage of a printing process and configured to provide a client device with information of the printing job, said printing job being generated corresponding to a printing request from the client device connected to the printing processing device via a network, said printing processing device comprising:
a job information providing unit configured to provide the client device, in response to an information providing request from the client device for providing information of the printing job, with first job state identification information and second job state identification information in connection with the first job state identification information, said first job state identification information being used for identifying a state of a first-stage job generated at a first stage of the printing process, said second job state identification information being used for identifying a state of a second-stage job generated at a second stage of the printing process, said second-stage job being generated from the first-stage job and having a job granularity different from the job granularity of the first-stage job;
a first job unit configured to execute the first-stage job; and
a second job unit, different from the first job unit, configured to execute the second-stage job.

25. A printing processing system comprising:
a printing processing device configured to control a printing job according to a stage of a printing process; and
a display data generating device configured to generate display data for displaying information of the printing job from the printing processing device;
wherein
the printing processing device includes a job information providing unit configured to provide the display data generating device, in response to an information providing request from the display data generating device for providing information of the printing job, with first job state identification information and second job state identification information in connection with the first job state identification information, said first job state identification information being used for identifying a state of a first-stage job generated at a first stage of the printing process, said second job state identification information being used for identifying a state of a second-stage job generated at a second stage of the printing process, said second-stage job being generated from the first-stage job and having a job granularity different from the job granularity of the first-stage job;
a first job unit configured to execute the first-stage job; and
a second job unit, different from the first job unit, configured to execute the second-stage job; and
the display data generating device includes a data generating unit configured to generate the display data for displaying a state of the first-stage job and a state of the second-stage job based on the first job state identification information and the second job state identification information.

26. The printing processing system as claimed in claim 25, wherein the display data generating device is further configured to transmit the display data to a display unit capable of displaying the display data via a network.

27. The printing processing system as claimed in claim 25, wherein the display data are displayed with the state of the first-stage job being in connection with the state of the second-stage job.

28. The printing processing system as claimed in claim 27, wherein the display data are displayed with the state of the first-stage job and the state of the second-stage job being in a hierarchical structure.

29. A method of controlling a printing processing device to control a printing job according to a stage of a printing process and provide a client device with information of the printing job, said printing job being generated corresponding to a printing request from the client device connected to the printing processing device via a network, said method comprising:
  providing the client device, in response to an information providing request from the client device for providing information of the printing job, with first job state identification information and second job state identification information in connection with the first job state identification information, said first job state identification information being used for identifying a state of a first-stage job generated at a first stage of the printing process, said second job state identification information being used for identifying a state of a second-stage job generated at a second stage of the printing process, said second-stage job being generated from the first-stage job and having a job granularity different from the job granularity of the first-stage job;
  executing the first-stage job in a first job unit; and
  executing the second-stage job in a second job unit, different from the first job unit.

30. The method as claimed in claim 29, wherein
  the information providing request includes a first job identifier for identifying the first-stage job; and
  in the providing step, the first job state identification information and a second job identifier are provided to the client device, said first job state identification information corresponding to the first job identifier, said second job identifier being used for identifying the second-stage job generated from the first-stage.

31. The method as claimed in claim 30, wherein in the providing step, information of a number of the second-stage jobs is also provided to the client device.

32. The method as claimed in claim 29, further comprising:
  updating a value of the first job state identification information when the state of the first-stage job changes.

33. The method as claimed in claim 32, wherein in the updating step, the value of the first job state identification information is updated when the second-stage job is generated from the first-stage job.

34. The method as claimed in claim 32, wherein in the updating step, the value of the first job state identification information is updated when states of a plurality of the second-stage jobs generated from the first-stage job change.

35. A storage medium for storing a program executable in a computer for controlling a printing processing device to control a printing job according to a stage of a printing process and provide a client device with information of the printing job, said printing job being generated corresponding to a printing request from the client device connected to the printing processing device via a network, said program controlling the printing processing device to execute a step of:
  providing the client device, in response to an information providing request from the client device for providing information of the printing job, with first job state identification information and second job state identification information in connection with the first job state identification information, said first job state identification information being used for identifying a state of a first-stage job generated at a first stage of the printing process, said second job state identification information being used for identifying a state of a second-stage job generated at a second stage of the printing process, said second-stage job being generated from the first-stage job and having a job granularity different from the job granularity of the first-stage job;
  executing the first-stage job in a first job unit; and
  executing the second-stage job in a second job unit, different from the first job unit.

* * * * *